United States Patent
Van Dillen et al.

(10) Patent No.: US 9,556,011 B2
(45) Date of Patent: Jan. 31, 2017

(54) APPARATUSES AND METHODS FOR A REFRIGERATOR HAVING LIQUID CONDITIONING AND ENHANCEMENT COMPONENTS FOR ENHANCED BEVERAGE DISPENSING

(75) Inventors: Tiemen Van Dillen, Varese (IT); Lukasz D. Skalski, Sterling Heights, MI (US); Luca Gamberoni, Ispra (IT); Ronald L. Voglewede, Saint Joseph, MI (US); Nihat O. Cur, Saint Joseph, MI (US); Gregory G. Hortin, Henderson, KY (US)

(73) Assignee: Whirlpool Corporation, Benton Harbor, MI (US)

( * ) Notice: Subject to any disclaimer, the term of this patent is extended or adjusted under 35 U.S.C. 154(b) by 1622 days.

(21) Appl. No.: 12/129,043

(22) Filed: May 29, 2008

(65) Prior Publication Data
US 2009/0293735 A1    Dec. 3, 2009

(51) Int. Cl.
| | | |
|---|---|---|
| *F25B 3/00* | (2006.01) | |
| *B67D 1/00* | (2006.01) | |
| *A47J 31/06* | (2006.01) | |
| *A47J 31/40* | (2006.01) | |
| *A47J 31/44* | (2006.01) | |
| *B67D 1/08* | (2006.01) | |
| *F25D 23/12* | (2006.01) | |

(52) U.S. Cl.
CPC .......... *B67D 1/0014* (2013.01); *A47J 31/0668* (2013.01); *A47J 31/407* (2013.01); *A47J 31/4403* (2013.01); *B67D 1/0861* (2013.01); *F25D 23/12* (2013.01)

(58) Field of Classification Search
CPC ...... A47J 31/0668; A47J 31/407; F25D 23/12; B67D 1/0014; B67D 1/0861
USPC .................................................... 62/389–390
See application file for complete search history.

(56) References Cited

U.S. PATENT DOCUMENTS

| | | | |
|---|---|---|---|
| 2,823,833 A | | 2/1958 | Bauerlein |
| 3,069,871 A | * | 12/1962 | Johnson .......................... 62/390 |
| 3,282,527 A | | 11/1966 | D'Incerti |
| 3,628,444 A | | 12/1971 | Mazza |
| 4,538,636 A | | 9/1985 | Cleland |
| 4,667,853 A | | 5/1987 | Kruger |
| 4,930,666 A | | 6/1990 | Rudick |
| 5,398,595 A | | 3/1995 | Fond et al. |
| 5,628,895 A | * | 5/1997 | Zucholl .......................... 210/85 |
| 5,678,592 A | | 10/1997 | Boticki et al. |
| 5,738,135 A | * | 4/1998 | Johnson ................... 137/119.06 |
| 6,026,732 A | | 2/2000 | Kollep et al. |

(Continued)

FOREIGN PATENT DOCUMENTS

| | | |
|---|---|---|
| DE | 3417005 A1 | 11/1985 |
| EP | 1832826 A2 | 9/2007 |
| WO | 03/046447 A1 | 6/2003 |

OTHER PUBLICATIONS

Merriam-Webster definition of about.*

*Primary Examiner* — Frantz Jules
*Assistant Examiner* — Joseph Trpisovsky

(57) ABSTRACT

Apparatuses and methods for conditioning a liquid stream with a liquid dispensing system associated with a refrigerator, preparing an enhanced beverage using one or more of the individually conditioned liquid streams and a liquid enhancement device and minimizing the potential for back contamination of the liquid dispensing system are provided.

25 Claims, 29 Drawing Sheets

(56) References Cited

U.S. PATENT DOCUMENTS

| | | | |
|---|---|---|---|
| 6,039,219 A | 3/2000 | Bach et al. | |
| 6,655,260 B2 | 12/2003 | Lazaris et al. | |
| 6,672,097 B1 * | 1/2004 | Ashley | 62/340 |
| 6,854,378 B2 | 2/2005 | Jarisch et al. | |
| 6,955,116 B2 | 10/2005 | Hale | |
| 6,962,275 B2 | 11/2005 | DeCler et al. | |
| 7,063,238 B2 | 6/2006 | Hale | |
| 7,111,759 B1 | 9/2006 | Gorski et al. | |
| 7,228,701 B2 | 6/2007 | Kim | |
| 7,231,869 B2 | 6/2007 | Halliday et al. | |
| 7,255,039 B2 | 8/2007 | Halliday et al. | |
| 7,278,552 B2 | 10/2007 | Crisp, III | |
| 7,997,448 B1 * | 8/2011 | Leyva | 222/129.1 |
| 2002/0046951 A1 * | 4/2002 | Shallow et al. | 205/98 |
| 2002/0078831 A1 * | 6/2002 | Cai | 99/295 |
| 2002/0144603 A1 | 10/2002 | Taylor | |
| 2002/0148656 A1 | 10/2002 | Li | |
| 2003/0056655 A1 | 3/2003 | Kollep et al. | |
| 2003/0222089 A1 | 12/2003 | Hale | |
| 2005/0268638 A1 | 12/2005 | Voglewede et al. | |
| 2006/0144242 A1 | 7/2006 | Mitchell et al. | |
| 2006/0144244 A1 | 7/2006 | Girard et al. | |
| 2006/0230779 A1 | 10/2006 | Kwon | |
| 2007/0012719 A1 | 1/2007 | Holler | |
| 2007/0209522 A1 | 9/2007 | Bigge et al. | |

* cited by examiner

APPARATUSES AND METHODS FOR A REFRIGERATOR HAVING LIQUID CONDITIONING AND ENHANCEMENT COMPONENTS FOR ENHANCED BEVERAGE DISPENSING

FIELD OF THE INVENTION

The present invention relates to an enhanced beverage dispensing refrigerator, and more particularly, to an apparatus and method for a refrigerator having a liquid conditioning system and a liquid enhancement system for preparing and dispensing an enhanced beverage by combining or affecting one or more conditioned liquid streams provided by the liquid conditioning system with one or more liquid enhancement components provided by the liquid enhancement system.

BACKGROUND OF THE INVENTION

Dispensing liquid from an indoor dispenser of a refrigerator is well known. In fact, many new and existing refrigerators have an indoor dispenser having a liquid outlet to dispense liquid from the refrigerator. All though these existing refrigerators can dispense one or more types of conditioned liquid streams, no concept or platform exists wherein the refrigerator is configured to dispense a number of conditioned liquid streams, such as a heated liquid stream, a chilled liquid stream, a carbonated liquid stream, a filtered liquid stream, an irradiated liquid stream, an oxygenated liquid stream and/or other conditioned liquid streams. Because current refrigerators lack one or more of these conditioned liquid streams, they are incapable of producing a broad gammit of enhanced beverages. Even where an existing refrigerator is capable of producing one or more conditioned liquid stream, the devices or the systems for enhancing or flavoring the conditioned liquid stream are typically internal to the refrigerator and not liquid enhancement hardware, architecture or componentries that can be connected at the liquid dispensing outlet to enhance the conditioned liquid stream dispensed from the indoor dispenser to provide an enhanced beverage for drinking.

Therefore, a need has been identified in the art to provide an apparatus and method for a refrigerator with a liquid dispensing system having the advantage of multi-level conditioning of a liquid stream before being dispensed and a liquid enhancement system to prepare an enhanced beverage using the conditioned liquid streams Still some systems exist within the refrigerator platform that use a conditioned liquid stream combined with a liquid enhancement component to provide an enhanced beverage; however, these systems often require purging of either the liquid dispensing system or the liquid enhancement systems to try and keep contaminates from being drawn back into either or both systems. Purging these systems does not always insure or minimize the potential for back contamination of the liquid dispensing or liquid enhancement systems.

Therefore, a need has been identified in the art to provide apparatuses and methods for conditioning a liquid stream with a liquid dispensing system associated with a refrigerator, preparing an enhanced beverage with a liquid enhancement system using one or more of the individually conditioned liquid streams and minimizing the potential for back contamination of the liquid dispensing system.

BRIEF SUMMARY OF THE INVENTION

Apparatus and methods for a refrigerator with a liquid dispensing system having the advantage of a multi-level conditioning of a liquid stream before being dispensed in a liquid enhancement system to prepare and enhance beverage using the condition liquid streams and minimize the potential for back contamination of the liquid dispensing system are provided.

According to one aspect of the present invention, a refrigerator with a liquid dispensing system having the advantage of multi-level conditioning of a liquid stream before being dispensed and a liquid enhancement system to prepare an enhanced beverage using the conditioned liquid streams and minimize the potential for back contamination of the liquid dispensing system is disclosed. The refrigerator includes: a cabinet body, a dispenser associated with the cabinet body wherein the dispenser has a dispenser outlet area proximate a liquid dispensing outlet associated with the dispenser; a plurality liquid conditioning components associated with the cabinet body to provide a plurality of individually conditioned liquid streams wherein the liquid conditioning components include a liquid heating component to provide a heated liquid stream and a liquid cooling component to provide a cooled liquid stream; and a liquid enhancement device interface about the liquid dispensing outlet at the dispensing outlet area for preparing the enhanced beverage. In a preferred form, the plurality of liquid conditioning components include a liquid carbonating component to provide a carbonated liquid stream and a liquid filtering component to provide a filtered liquid stream. The refrigerator also includes a liquid enhancement device having a container body housing one or more liquid enhancement components, the liquid enhancement device and the liquid enhancement device interface on at the dispensing outlet have cooperative attachment interfaces to secure the liquid enhancement device about the liquid dispensing outlet at the dispensing outlet area to communicate one or more of the plurality individual conditioned liquid streams from the liquid dispensing outlet to the liquid enhancement device. A cavity is formed about the liquid dispensing outlet in the dispensing outlet area such that the cavity is closed by attaching the liquid enhancement device to the liquid enhancement device interface. An air buffer that is formed in the cavity between the liquid dispensing outlet and enhanced liquid within the liquid enhancement device minimizes the potential for back contamination of the liquid dispensing system associated with the refrigerator.

According the another aspect of the present invention, a new method for conditioning a liquid stream with a liquid dispensing system associated with a refrigerator, preparing an enhanced beverage with a liquid enhancement system using one or more of the individually conditioned liquid streams and minimizing the potential for back contamination of the liquid dispensing system is disclosed. The method includes the steps of: providing a cabinet body with a dispenser having a dispensing outlet area proximate a liquid dispensing outlet and a liquid enhancement device interface about the liquid dispensing outlet at the dispensing outlet area; cooling the liquid stream with a liquid cooling component to provide a cooled liquid stream; heating the liquid stream with a liquid heating component to provide a heated liquid stream; and, enhancing one or more of the conditioned liquid streams at the liquid enhancement device interface for preparing the enhanced beverage. In the preferred form the method also includes steps of carbonating the liquid stream with a liquid carbonating component to provide a carbonated liquid stream as one of the individually conditioned liquid streams and filtering the liquid stream with a liquid filtering component to provide a filtered liquid stream as one of the individually conditioned liquid streams. Also included are the steps of: securing a liquid enhancement device about the liquid dispensing outlet at the liquid enhancement device interface, wherein the liquid enhancement device has a container body with a sealed inlet and outlet and houses one or more liquid enhancement components; and, communicating at least one of the individually conditioned liquid streams from the liquid dispensing outlet through or past the liquid enhancement device to combine or affect the conditioned liquid stream with the liquid enhancement component to prepare the enhanced beverage. The method also includes closing off a cavity formed about the liquid dispensing outlet and the dispensing outlet area by attaching the liquid enhancement device to the liquid enhancement device interface and creating an air buffer in the cavity between the liquid dispensing outlet and enhanced liquid within in the liquid enhancement device to minimize the potential for back contamination of the liquid dispensing system associated with the refrigerator.

BRIEF DESCRIPTION OF THE DRAWINGS

While the specifications concludes with claims particularly pointing out and distinctly claiming the invention, it is believed that the present invention will be better understood from the following description taken in conjunction with the accompanying drawings in which:

DETAILED DESCRIPTION OF THE PREFERRED EMBODIMENTS

The preferred embodiments of the present invention have been set forth within the drawings and in the foregoing description and although specific terms are employed, these are used in the generically descriptive sense only are not used for the purposes of limitation. Changes in the formed proportioned of parts as well as in the substitution of equivalents are contemplated as circumstances may suggest or are rendered expedient without departing from the spirit and scope of the invention as further defined in the following description and claims.

The apparatuses and methods of the present invention are directed to a refrigerator or other liquid dispensers having a liquid conditioning system having one or more liquid conditioning components to provide a conditioned liquid stream configured to operate in cooperation with a liquid enhancement system to prepare an enhanced beverage using the conditioned liquid stream while minimizing the potential for back contamination of the liquid dispensing system associated with the refrigerator.

Apparatus

Figure 1A:
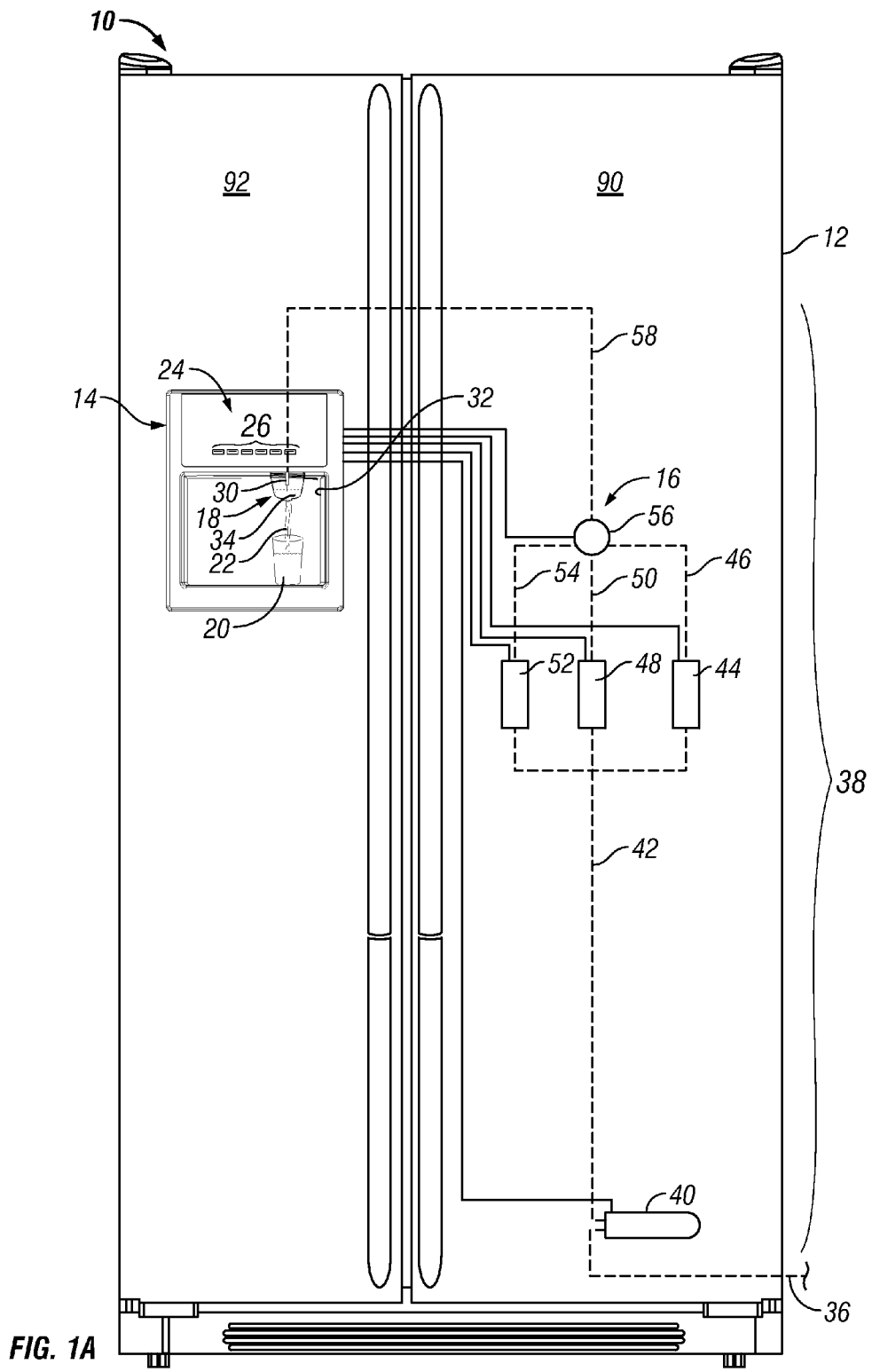
FIG. 1A is a front elevation view of a refrigerator illustrating the liquid conditioning system associated with the refrigerator and the liquid enhancement system the liquid enhancement components associated with liquid dispenser according to an exemplary embodiment of the present invention.

FIG. 1A illustrates a refrigerator 10 having a cabinet body 12 including a refrigerated compartment 90 and a freezer compartment 92 and an indoor dispenser 14 associate with cabinet body 12. The refrigerator 10 includes a liquid dispensing system 16. The liquid dispensing system 16 is connected to liquid stream inlet 36. Liquid from a plumbed water line enters into refrigerator 10 through liquid stream inlet 36 in fluid communication with liquid dispensing 16. Those skilled in the art can appreciate and understand that liquid entering refrigerator 10 through liquid stream inlet 36 need not come from a plumber water line, but could come from a stored water source, such as a water bottle.

Figure 1B:
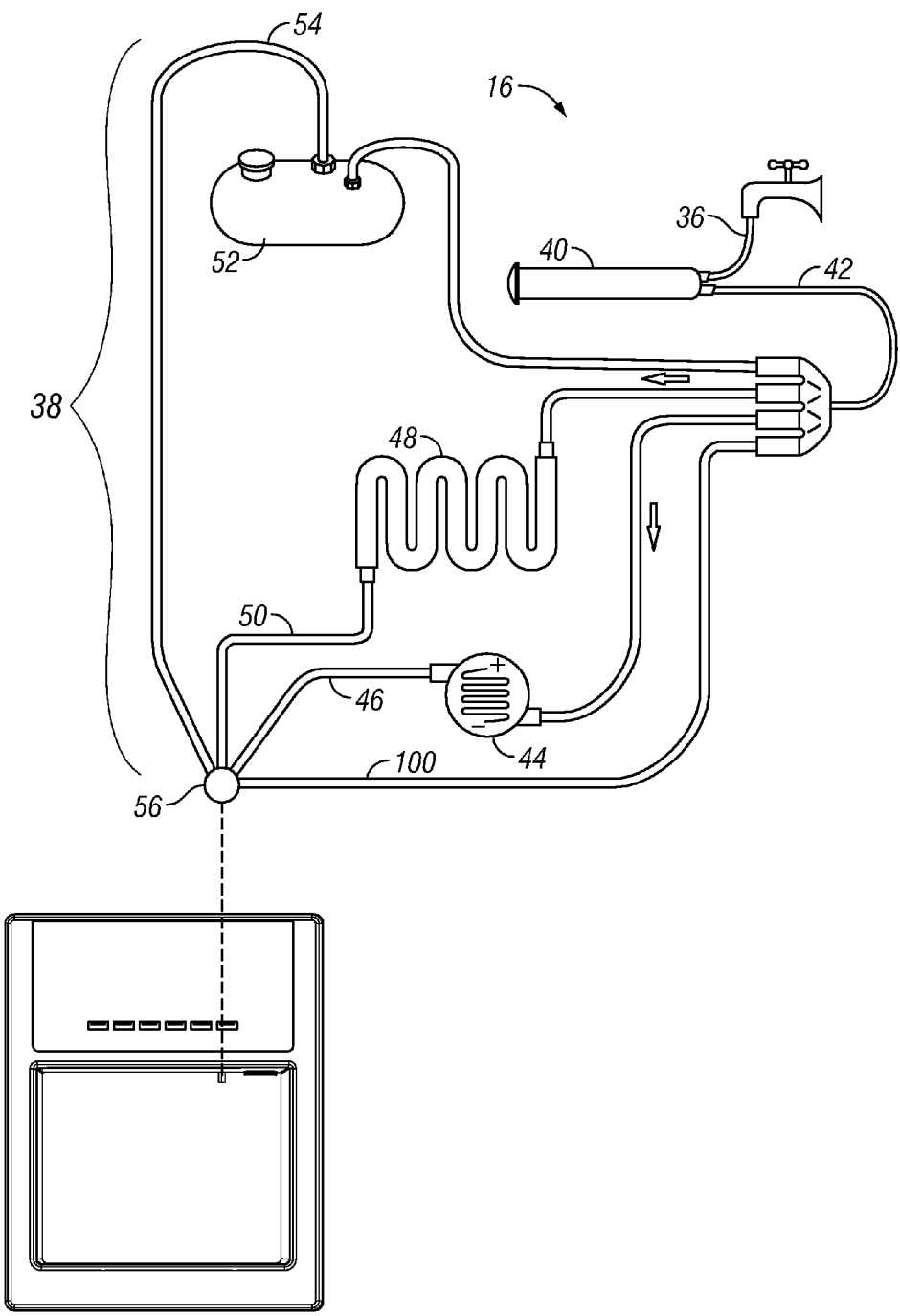
FIG. 1B is a flow diagram for the liquid conditioning system associated with the refrigerator for providing a plurality of conditioned liquid streams according to an exemplary embodiment of the present invention.

The liquid dispensing system 16, as best illustrated in FIGS. 1A and 1B, includes a plurality of liquid conditioning components 38. FIG. 1B illustrates several of the liquid conditioning components. In one aspect of the present invention, the plurality of the liquid condition components 38 could include a liquid filtering component 40, a liquid heating component 44, a liquid cooling component 48, and/or a liquid carbonated component 52. Those skilled in the art can appreciate that any one or more of the plurality of the liquid conditioning components 38 together with one, another, or all the conditioning components and is not limited to those illustrated in FIG. 1A-1B. For example, the present invention contemplates other conditioning components suitable for use in the liquid dispensing system 16 of refrigerator 10. Other liquid conditioning components include, but are not limited to, a liquid oxygenating component whereby the liquid stream is conditioned or oxygenated as part of the liquid dispensing system 16. In another aspect, the liquid dispensing system 16 may include a liquid irradiating component whereby the liquid irradiating component maybe configured to irradiate the liquid stream with UV lighting or any other lighting to condition the liquid stream. In yet another aspect, as best illustrated in FIG. 1B, a source of ambient temperature liquid may be for providing ambient temperature liquid to the indoor dispenser 14 for use at liquid dispensing outlet 30.

In FIG. 1A liquid introduced into the refrigerator through liquid stream inlet 36 is communicated through liquid filtering component 40. A filtered liquid line communicates filtered liquid from filtered liquid component 40 into one or more of the plurality of remaining liquid conditioning components 38. For example, the conditioned liquid line 42 could junction and be split between the remaining plurality of liquid conditioning components 38 associated with refrigerator 10 to provide filtered liquid to each of the conditioning components 38. FIG. 1A illustrates the filtered liquid line 42 in communication with liquid heating component 44, liquid cooling component 48, and liquid carbonating component 52 according to an exemplary embodiment of the present invention. In this aspect, heated liquid is fluidly communicated from liquid heating component 44 through heated liquid line 46 upon actuation of valve 56. Similarly, chilled liquid or cooled liquid is communicated from liquid cooling component 48 through cooled liquid line 50 upon actuation of valve 56. Filtered liquid communicated through filtered liquid line 42 into liquid carbonating component 52 is communicated through carbonated liquid line 54 upon actuation of valve 56. Those skilled in the art can appreciate that the order in which liquid stream inlet 36 is communicated to one or more of plurality of liquid conditioning components 38 associated with the refrigerator 10 could be rearranged such that the liquid dispensing system 16 operates the most efficiently. For example, liquid from liquid stream inlet 36 could be communicated through one or more of the plurality of liquid conditioning components 38 before the liquid filtering component 40. Alternatively, filtered liquid line 42 could communicate filter liquid directly to liquid dispensing outlet 30 of indoor dispenser 14. Those skilled in the art can also appreciate that valve 56 could be upstream or down stream of the plurality of the liquid components 38 or valve 56 could be configured within each liquid conditioning component and actuated by a control system associated with indoor dispenser 14. Those skilled in the art can further appreciate that any one or more plurality of the liquid conditioning components 38 could be controlled and monitored electronically by being electrically or wirelessly connected to controls 26 associated with the user interface 24 of indoor dispenser 14. The plurality of conditioning components 38 are not described herein. Suffice it to say, there are many commercially available heaters, chillers and carbonators for heating, chilling and carbonating liquid to use as a liquid heating component 44, liquid cooling component 48 and liquid carbonating component 52. For example, an in-line heater, reservoir heater or batch system heater may be used to provide heated liquid. The refrigeration system may be used to provide cooled or chilled liquid. The commercial carbonator system could include any number of commercially available components, such as a carbonator, water pump, pressure reducer, level controls and sensors, power supply, electrovalves, $CO_2$ tank and/or piping to provide a carbonated liquid.

FIG. 1A-B further illustrate a conditioned liquid line for communicating one or more of the plurality of conditioned liquid streams from the plurality of the liquid conditioning components 38 to liquid dispensing outlet 30 on indoor dispenser 14. The plurality of conditioned liquid streams can be communicated in a single conditioned liquid line 58 or multiple lines for communicating each conditioned liquid stream individually from the plurality of the liquid conditioning components 38 to liquid dispensing outlet 30 on indoor dispenser 14.

Figure 1C:
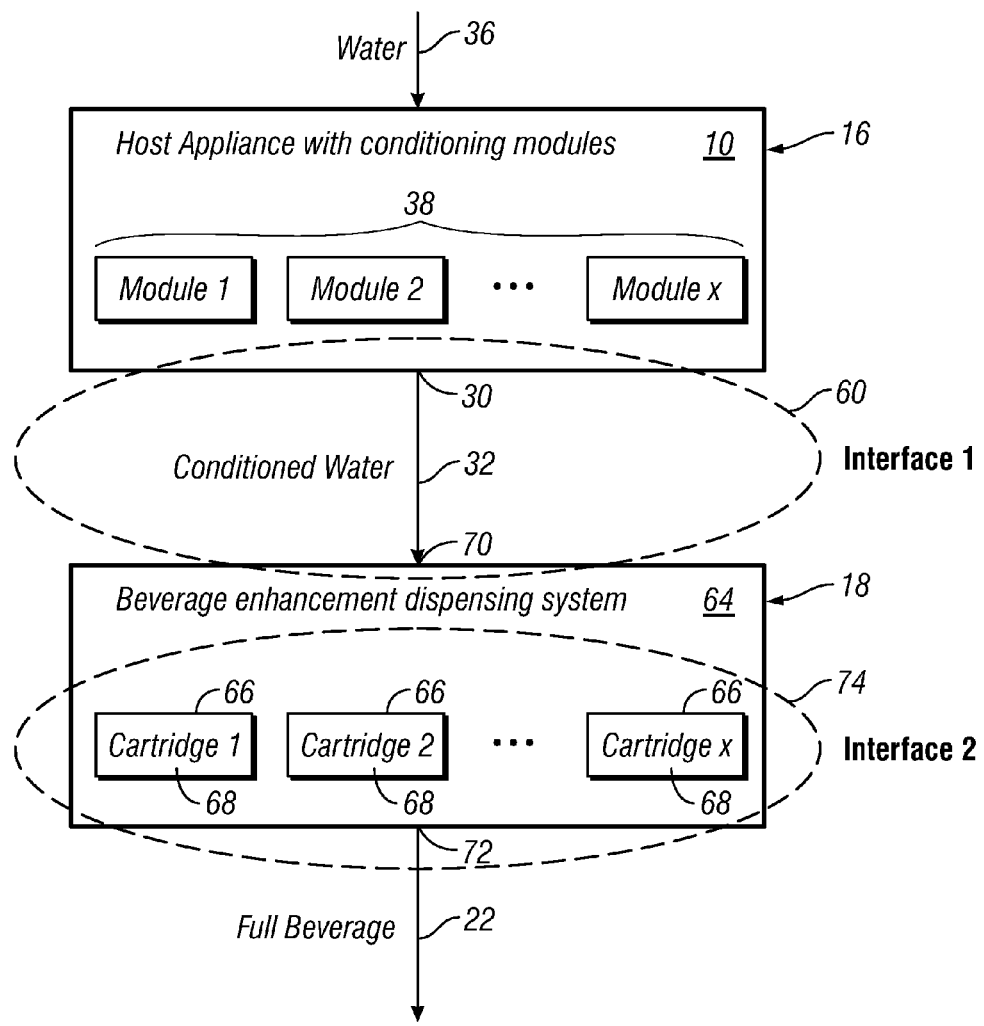
FIG. 1C is a flow diagram illustrating the liquid conditioning system, liquid enhancement system and the interfaces between the two for providing an enhanced beverage according to the exemplary embodiment of the present invention.

FIG. 1C illustrates another exemplary aspect of the present invention. According to the aforementioned concepts, liquid from liquid stream inlet 36 enters into the host appliance, such as a liquid dispenser or refrigerator 10. The host appliance includes a plurality of liquid conditioning components 38, such as module 1, module 2, etc. (see FIG. 1C). Those skilled in the art can appreciate that each module may be used to provide a conditioned liquid from liquid stream inlet 36. For example, module 1 maybe used to provide a heated liquid stream, module 2 a carbonated liquid stream, and module X a chilled liquid stream. The host appliance is not limited to only those modules disclosed in FIG. 1C, but may include still other modules such as a module for providing ambient temperature liquid or an irradiating module which irradiates the liquid stream to provide irradiated liquid. Those skilled in the art can appreciate that one or more additional modules may be added to the host appliance or one module exchanged for another module to alter the capabilities of the liquid dispensing system 16. For example, the host appliance or refrigerator 10 may be configured to receive any number of liquid conditioning modules 38 to provide a plurality of conditioned liquid streams at liquid dispensing outlet 30. One or more of the conditioned liquid streams 32 are communicated to inlet 70 of liquid enhancement system 18. A liquid enhancement device interface 60 is provided and includes cooperating attachment interfaces for securing the liquid enhancement system 18 about or to the liquid dispensing outlet 30. The liquid enhancement system 18 includes, but is not limited to, a liquid enhancement device 64. A plurality of container bodies 66 may be included within liquid enhancement device 64. Each container body 66 includes a liquid enhancement component 68. The liquid enhancement component 68 is used to enhance the conditioned liquid stream 32 from liquid dispensing outlet 30 and dispense from liquid enhancement system 18 out outlet 72 as enhanced liquid stream 22. Cooperating attachment interfaces 74 are provided for securing one or more of container bodies 66 within or to liquid enhancement system 18. Those skilled in the art can appreciate that one or more container bodies 66 housing liquid enhancement components 68 may be added to liquid enhancement system 18, removed from liquid enhancement system 18 or swapped out with another for providing the desired enhancement to the conditioned liquid stream dispensed from liquid dispensing outlet 30 of liquid dispensing system 16. For example, according to the embodiment illustrated in FIG. 1C, cartridge one may include one liquid enhancement component 68 and cartridge two another liquid enhancement component 68 whereby liquid enhancement system 18 controls the flow of conditioned liquid stream 32 through one or more of the cartridges to provide the desired enhanced liquid stream 22 at outlet 72 of liquid enhancement system 18.

Figure 2:
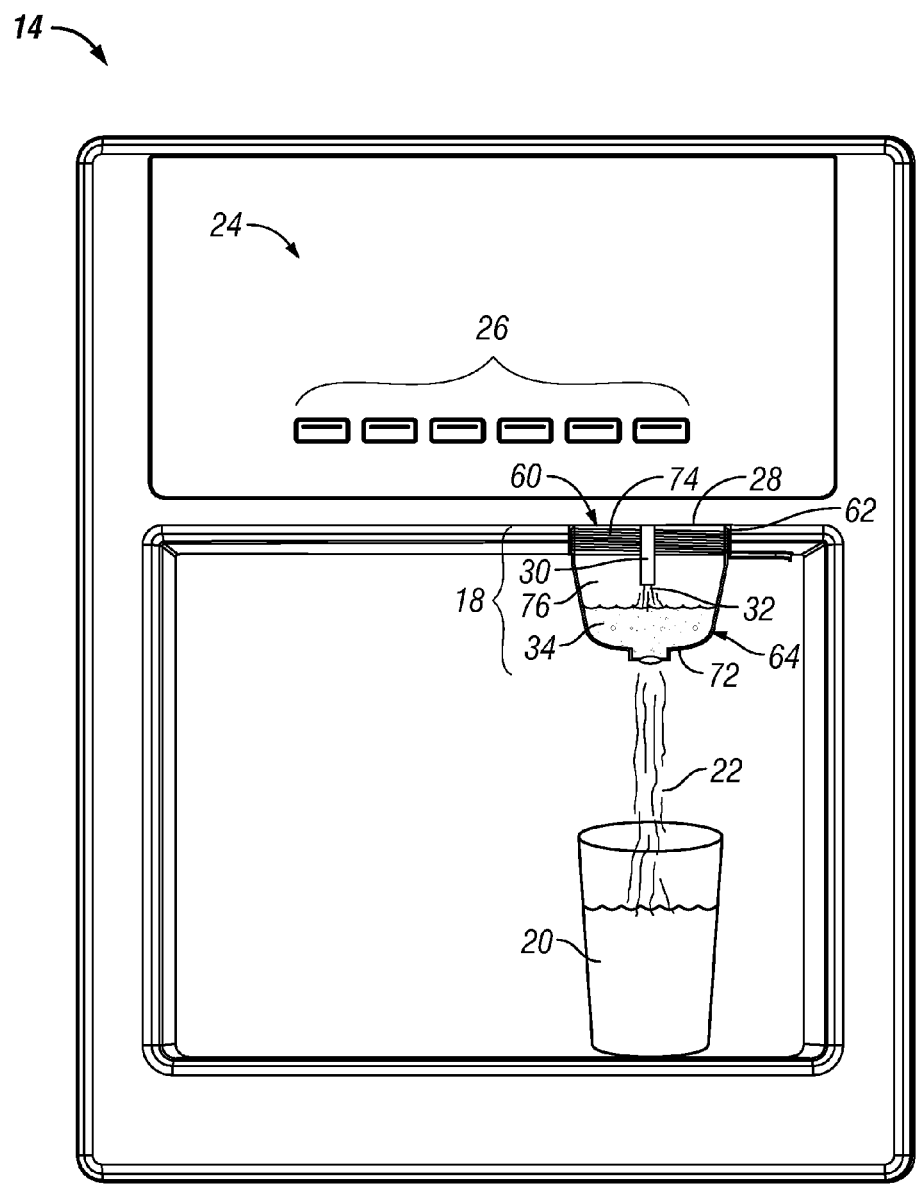
FIG. 2 is a front elevation view of the indoor dispenser and the liquid enhancement system according to an exemplary embodiment of the present invention.

FIG. 2 best illustrates indoor dispenser 14 shown in FIG. 1A. Indoor dispenser 14 includes a liquid enhancement system 18. In the broadest sense, liquid enhancement system 18 provides the means for enhancing conditioned liquid streams dispensed from liquid dispensing outlet 30 of indoor dispenser 14 using a liquid enhancement device 64 mounted external to indoor dispenser 14. According to one aspect of the present invention, indoor dispenser 14 includes a dispensing outlet area 28 proximate liquid dispensing outlet 30 associated with indoor dispenser 14. The dispensing outlet area 28 includes a liquid enhancement device interface 60. The liquid enhancement device interface 60 has an attachment interface 62 cooperating with a corresponding attachment interface 74 associated with liquid enhancement device 64. Refrigerator 10 or liquid enhancement system 18 includes one or more means to enclosably communicate one or more of the plurality of conditioned liquid streams 32 from the liquid dispensing outlet 30 through or by the liquid enhancement device 64; said means includes providing: (a) cooperating attachment interfaces on liquid enhancement device 64 and liquid enhancement device interface 60 to connect the two together to secure liquid enhancement device 64 about liquid dispensing outlet 30 at dispensing outlet area 28; (b) cooperating attachment interfaces on liquid enhancement device interface 60 and a liquid enhancement device holder 82 to connect the two together to secure liquid enhancement device 64 about liquid dispensing outlet 30 at dispensing outlet area 28; or, (c) cooperating attachment interfaces on liquid enhancement device 64 and liquid dispensing outlet 30 to connect the two together. For example, in one aspect of the present invention, liquid enhancement device 64 is secured about liquid dispensing outlet 30 at dispensing outlet area 28 by mating the cooperative attach interface 62 at liquid enhancement device interface 60 with corresponding cooperative attach interface 74 on liquid enhancement device 64.

According to another aspect of the present invention, liquid enhancement device 64 may be a single or multi-serve capsule, pouch or pod that is consumable, recyclable and commercially viable, which resonates with current trends in the enhanced beverage industry. Liquid enhancement device 64 includes one or more liquid enhancement components 68. Liquid enhancement components 68 may include, but not limited to, a flavoring component, a soluble component, a non-soluble component, a powder, a liquid, a brew, a nutraceutical, a medicine, a mineral, a vitamin, an aroma, any combination of the aforementioned liquid enhancement components 68, or any combination of the aforementioned liquid enhancement components 68 where one liquid enhancement component 68 interacts or reacts with another or with the conditioned liquid stream 32 to provide an enhanced liquid stream 22. Use of the term "liquid enhancement device" should be construed to mean for the purposes of the present invention that the enhancement device enhances the liquid and not that the enhancement device is liquid. The body of the liquid enhancement device may be configured as a container body (see FIGS. 4 and 5A-C), a pouch body, a capsule body (see FIG. 10A-B), a pod body (see FIG. 2), a straw body (see FIGS. 11A-C), or any like shaped body suitable for storing and dispensing the aforementioned liquid enhancement components 68.

Conditioned liquid stream 32 dispensed from liquid dispensing outlet 30 is communicated by or through liquid enhancement device 64 to combine with or be affected by liquid enhancement component 68 dispensed through outlet 72 as enhanced liquid stream 22 to provide an enhanced beverage 20 for drinking. In one aspect of the present invention, as best illustrated in FIGS. 3A, 6A, 8A, 9A, and 10A-B, a cavity 76 is formed between liquid dispensing outlet 30 and liquid enhancement component 68 (or conditioned liquid combined with or affected by liquid enhancement components 68) to provide a buffer between liquid enhancement component 68 (or conditioned liquid combined with or affected by liquid enhancement components 68) and liquid dispensing outlet 30 to minimize the potential for back contamination of liquid dispensing system 16 associated with refrigerator 10. Those skilled in the art can appreciate that indoor dispenser 14 may include a user interface 24 having controls 26 for controlling the dispersal of conditioned liquid stream 32 from liquid dispensing outlet 30 as well as for operating one or more of the plurality of liquid conditioning components 38 to provide one or more conditioned liquid streams 32 at liquid dispensing outlet 30 when requested for dispensing.

Figure 3A:
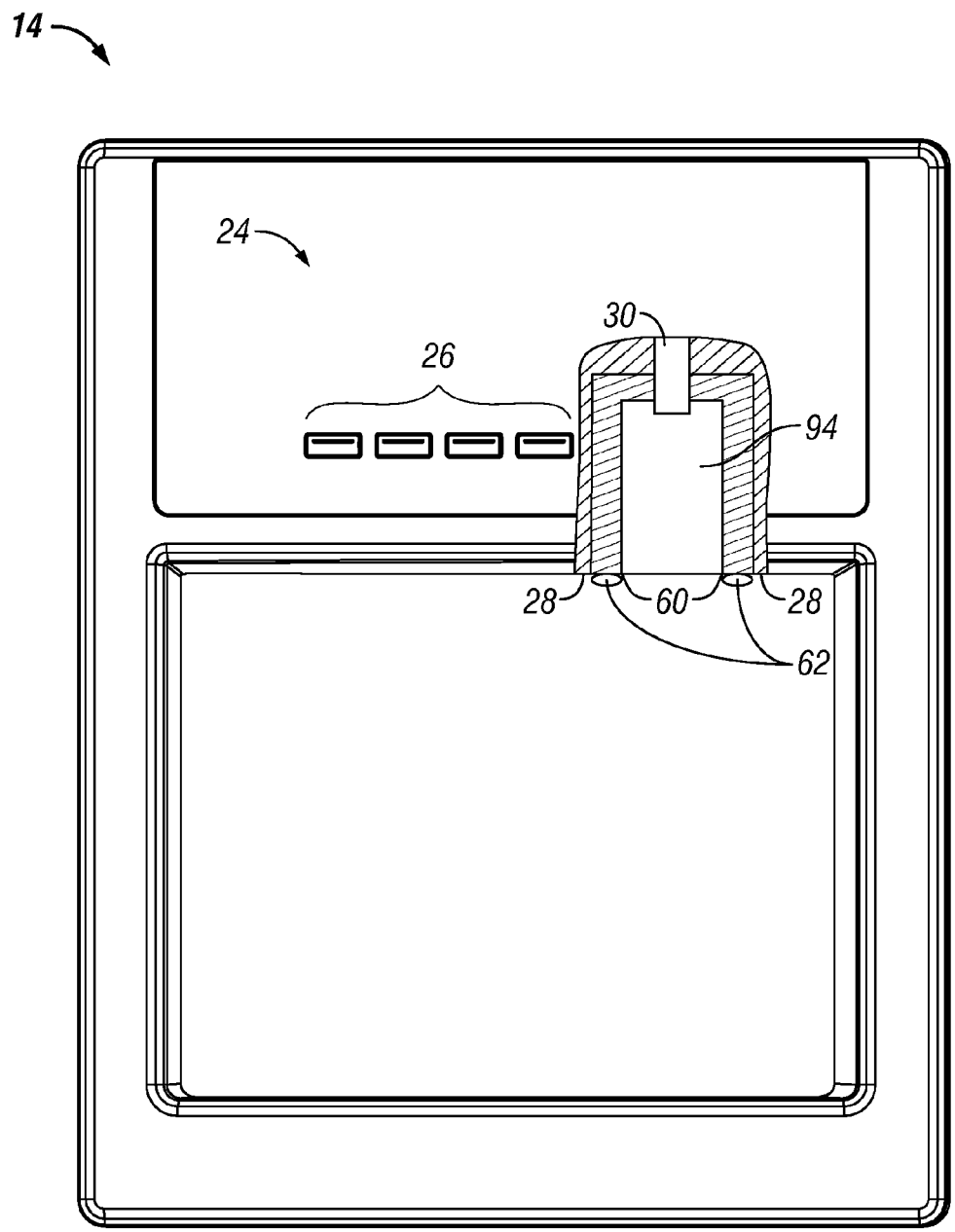
FIG. 3A is a front elevation view of the indoor dispenser illustrating architecture built into the dispenser according to an exemplary embodiment of the present invention.
Figure 3B:
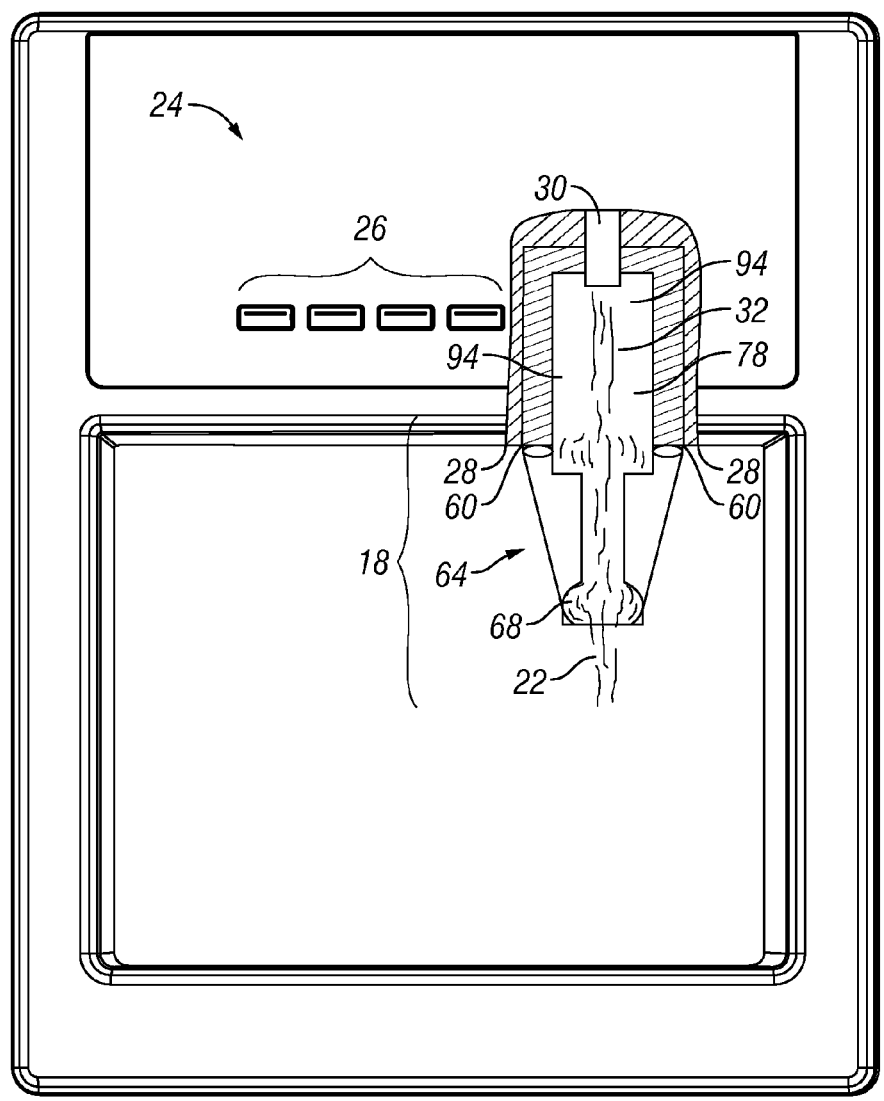
FIG. 3B is a front elevation view of the indoor dispenser shown in FIG. 3A with a liquid enhancement device attached at the liquid dispensing outlet area and operating to dispense an enhance beverage according to an exemplary embodiment of the present invention.
Figure 3C:
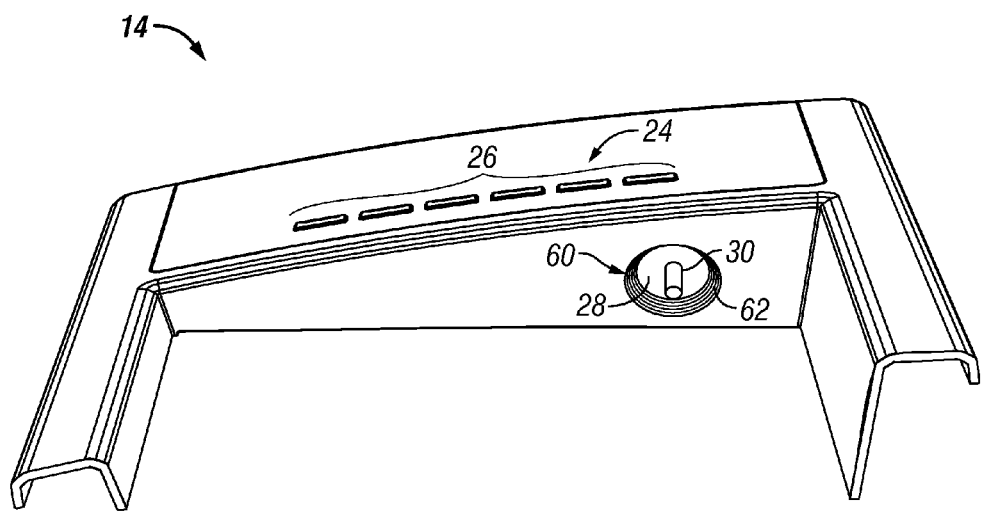
FIG. 3C is a perspective view of the indoor dispenser shown in FIG. 3A illustrating one type of cooperating attachment interface configured into the dispenser for attaching the liquid enhancement device thereto according to an exemplary embodiment of the present invention.
Figure 3D:
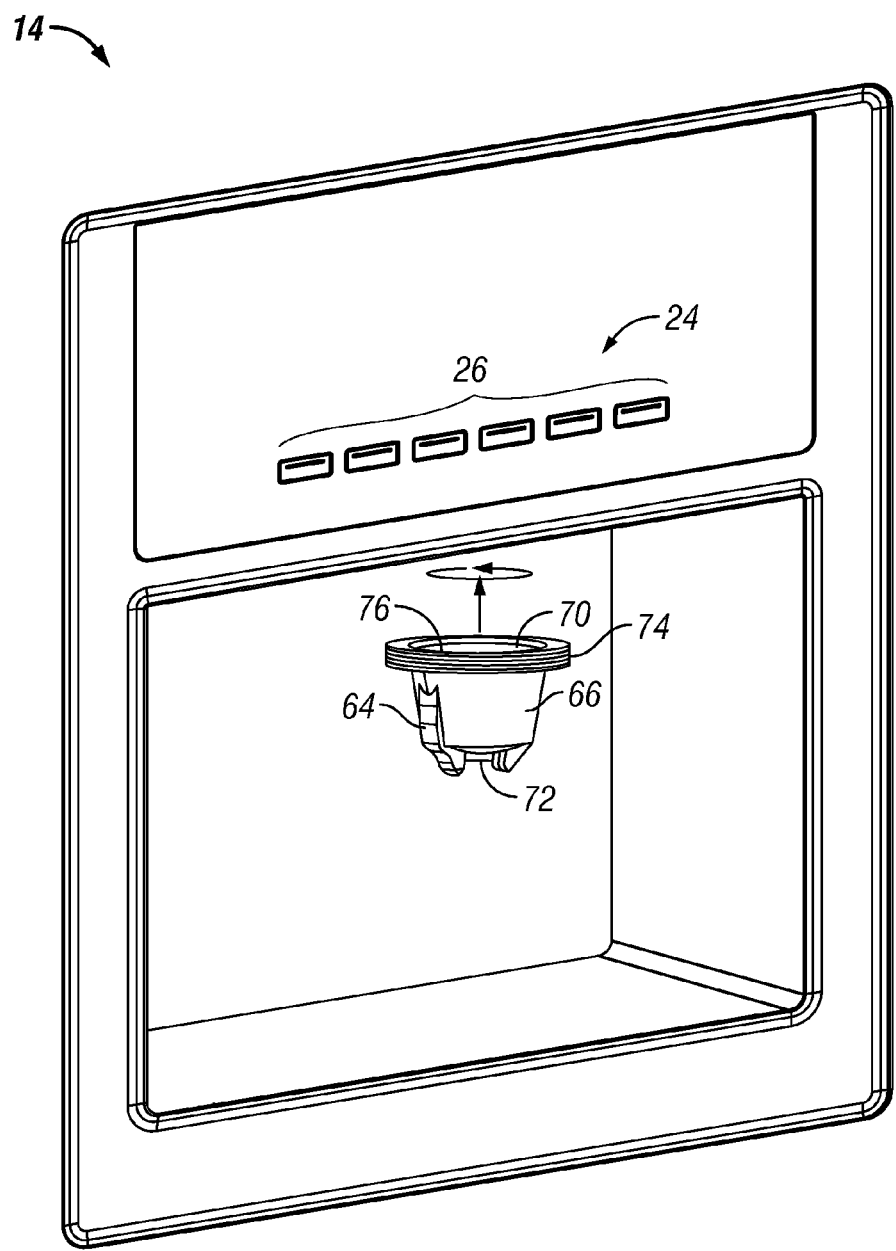
FIG. 3D is a perspective view of the indoor dispenser shown in FIG. 3A illustrating one exemplary aspect of the present invention for attaching the liquid enhancement device to the indoor dispenser.

FIG. 3A illustrates another aspect of the present invention wherein a cavity 94 is formed in indoor dispenser 14 according to an exemplary embodiment of the present invention. Liquid dispensing outlet 30 passes into cavity 94. A liquid enhancement device interface 60 is configured proximate cavity 94 about the dispensing outlet area 28 the liquid enhancement device interface 60 may include a cooperative attachment interface 62 for securing one or more types of liquid enhancement devices thereto. Cavity 94 formed about liquid dispensing outlet 30 in dispensing outlet area 28 is closed off by attaching liquid enhancement device 64 to liquid enhancement device interface 60 as best illustrated in FIG. 3B. Thus, liquid enhancement system 18 may be connected about dispensing outlet area 28 at liquid enhancement device interface 60. FIGS. 3C-3D illustrate one aspect of the present invention wherein cooperating attachment interfaces and the liquid enhancement devices interface 60 and liquid enhancement device 64 are threaded unions. Those skilled in the art can appreciate that cooperative attachment interfaces are not limited to a threaded union but may include other attachment interfaces, such as a quick coupler union, a compression fit union, a slip joint union, a gasket fitting union, or any other connection/union having structure to permanently or temporarily hold cooperating attachment interfaces on opposes components together. Using threads as cooperative attachment interface 74 on liquid enhancement device 64, liquid enhancement device 64 maybe threaded into liquid enhancement interface 60 using threads as the cooperating attachment interface 62 in the liquid enhancement device interface 60 as shown in FIG. 3C. In another aspect of the present invention, cooperating attachment interface 62 associated with liquid enhancement device interface 60 and cooperating attachment interface 74 associated with liquid enhancement device 64 forms an air-tight seal upon attaching liquid enhancement device 64 to liquid device enhancement interface 60. With liquid enhancement device 64 sealed to liquid enhancement device 60, the liquid enhancement device 64 may be operated at a pressure commensurate with a pressure of the conditioned liquid stream dispensed from the liquid dispensing outlet 30 of refrigerator 10. With liquid enhancement device 64 sealed to liquid enhancement device 60 of indoor dispenser, an air buffer 78 is formed within cavity 94 between liquid dispensing outlet 30 and liquid enhancement component 68 within liquid enhancement device 64 to minimize the potential of back contamination of the liquid dispensing system 16 associated with refrigerator 10. The present invention is not limited to the use of an air buffer for separating liquid enhancement component 68 or enhanced liquid streams from liquid dispensing outlet 30 to prevent contamination of liquid dispensing system 16 associated with refrigerator 10. The present invention contemplates other means for minimizing the potential for back contamination of the liquid dispensing system 16 in refrigerator 10. For example, flow of conditioned liquid stream 32 through liquid enhancement device 64 may be controlled, hygienically integrity of the liquid enhancement component 68 in the liquid enhancement device 64 preserved and back contamination of the liquid dispensing system 16 minimized by a manually openable seal, a pressure reputable seal, and adaptor puncturable seal, a one-way valve, or any combination of the foregoing. Providing a buffer 78 between liquid enhancement component 68, conditioned liquid stream 32 mixed with liquid enhancement component 68 and liquid dispensing outlet 30 is important to minimize the potential for back contamination of liquid dispensing system 16 and refrigerator 10. Those skilled in the art of refrigeration and specifically refrigerators having an indoor dispenser 14 appreciate that water still existing within liquid dispensing outlet 30 that is undispensed may be drawn back into liquid dispensing system 16 upon deactivation of the dispensing function associated with indoor dispenser 14 as a result of the vacuum or negative head that is produced upon the deactivation of dispensing system 16. Such behavior is minimized using the embodiments of the present invention wherein a buffer 78 is provided within cavity 76 separating liquid dispensing outlet 30 from liquid combined with liquid enhancement component 68 or liquid enhancement component 68 alone to minimize the potential for back contamination of liquid dispensing system 16.

Figure 4:
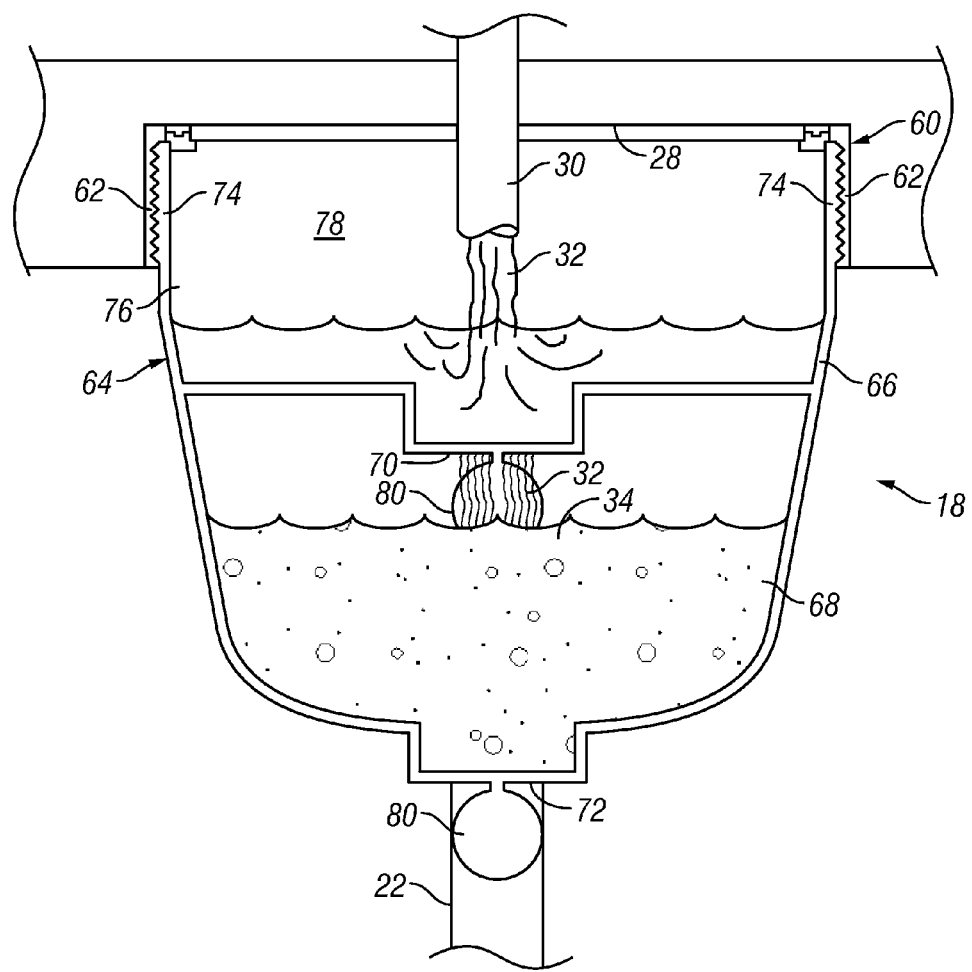
FIG. 4 is a sectional view of the attached liquid enhancement device when operating to dispense and enhance beverage for drinking according to an exemplary embodiment of the present invention.

FIGS. 4 and 5A-C illustrate one aspect of liquid enhancement device 64 according to an exemplary embodiment of the present invention. FIG. 4 is a section drawing of liquid enhancement device 64 of liquid enhancement system 18 attached to the liquid enhancement interface 60. Liquid enhancement device 64 includes cooperating attachment interface 74 for connecting to cooperative attachment interface 62 associated with liquid enhancement device interface 60. Liquid enhancement device 64 is attached about liquid dispensing outlet 30 proximate dispensing outlet area 28. Conditioned liquid stream 32 is dispensed from liquid dispensing outlet 30 into cavity 76 formed within liquid enhancement device 64. Containment body 66 of liquid enhancement device 64 houses a liquid enhancement component 68. Those skilled in the art can appreciate the number of liquid enhancement components 68 that could be included within container body 66 of liquid enhancement device 64. For example, liquid enhancement components 68 may include, but are not limited to, a flavoring component, a soluble component, a non-soluble component, a powder, a liquid, a brew, a nutraceutical, a medicine, a mineral, a vitamin, an aroma, any combination of the aforementioned liquid enhancement components 68, or any combination of the aforementioned liquid enhancement components 68 where one liquid enhancement component 68 interacts or reacts with another or with the conditioned liquid stream 32 to provide an enhanced liquid stream 22. FIG. 4 illustrates an exemplary embodiment of liquid enhancement device 64 wherein inlet 70 has a seal 80. Similarly, outlet 72 of liquid enhancement device 64 has a seal 80. Liquid enhancement components 68 within liquid enhancement device 64 are sealed within container body 66 by seals 80 on inlet 70 and outlet 72. According to one aspect of the present invention, seal 80 on inlet 70 and outlet 72 on liquid enhancement device 64 may be a pressure rupture seal configured to open as back pressure within cavity 76 increases to the pressure of conditioned liquid stream 32 dispensed from liquid dispenser outlet 30 or to the failure pressure of seals 80. Pressure of conditioned liquid stream 32 dispensed from liquid dispensing outlet 30 is attainable by providing a air tight environment whereby liquid enhancement device 64 is sealed to liquid enhancement device interface 60 such that air within cavity 76 cannot escape and conditioned liquid stream 32 dispensed into container body 66 causes pressure to build within cavity 76 until seal 80 on inlet 70 is ruptured after which or simultaneously seal 80 on outlet 72 is ruptured to dispense enhanced liquid stream 22 from liquid enhancement device 64. FIG. 4 and FIGS. 5A-C also illustrate air buffer 78 separating liquid dispensing outlet 30 from liquid enhancement component 68 as well as conditioned liquid stream 32 to minimize the potential for dispensed liquid or liquid enhancement component 68 from being drawn back up into liquid dispensing outlet 30 and thereby contaminating liquid dispensing system 16 associated with refrigerator 10.

Figure 6A:
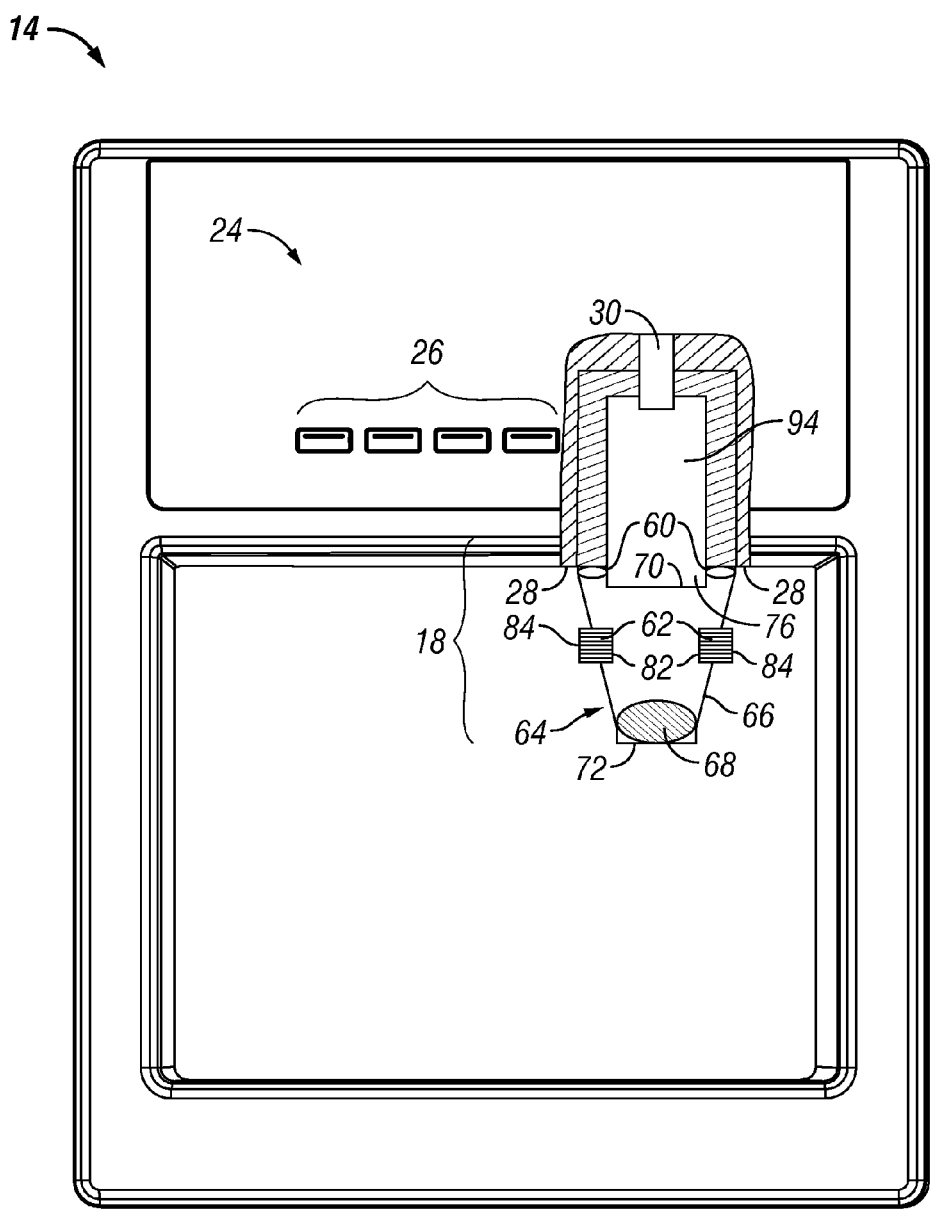
FIG. 6A is a front elevation view of an indoor dispenser configured with architecture to receive a liquid enhancement device according to an exemplary embodiment of the present invention.
Figure 6B:
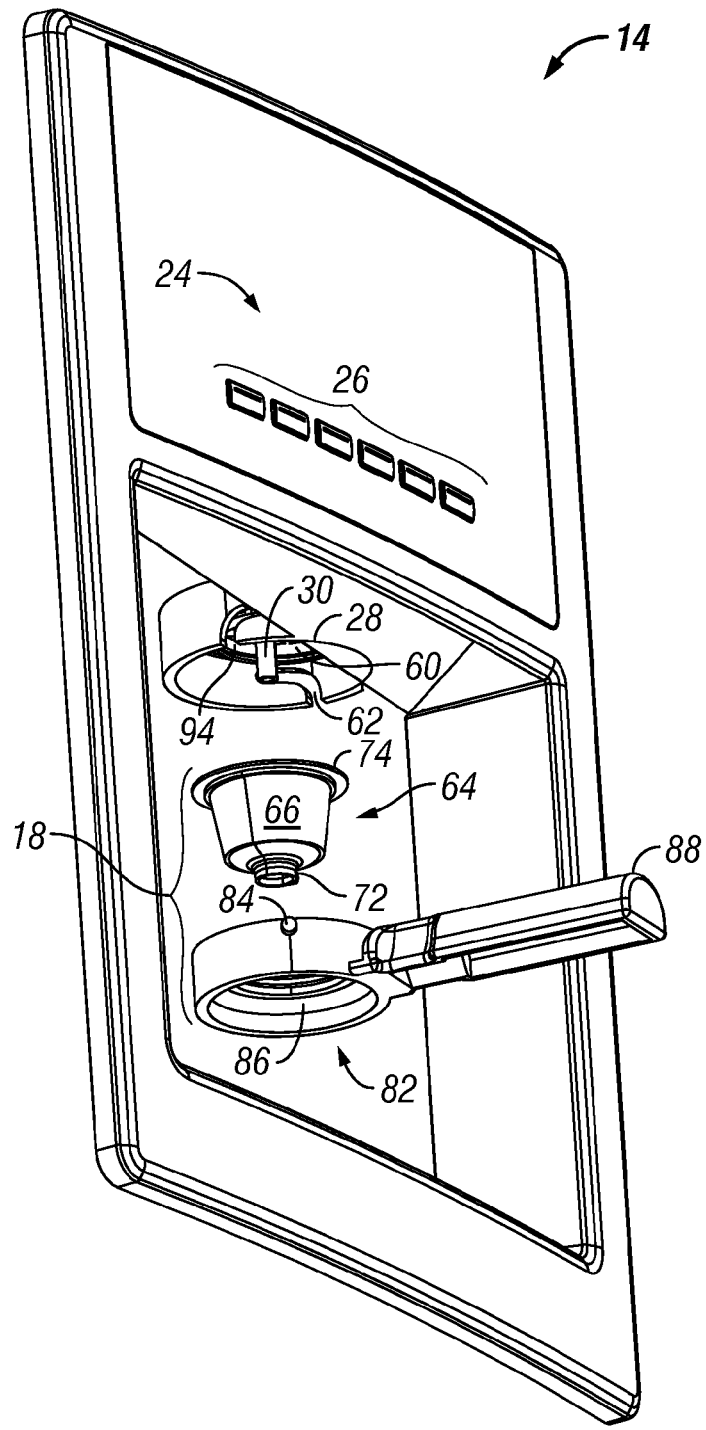
FIG. 6B is a perspective view of an indoor dispenser, liquid enhancement device and liquid enhancement device holder for securing the liquid enhancing device to the liquid enhancement device interface on the indoor dispenser according to an exemplary embodiment of the present invention.
Figure 6C:
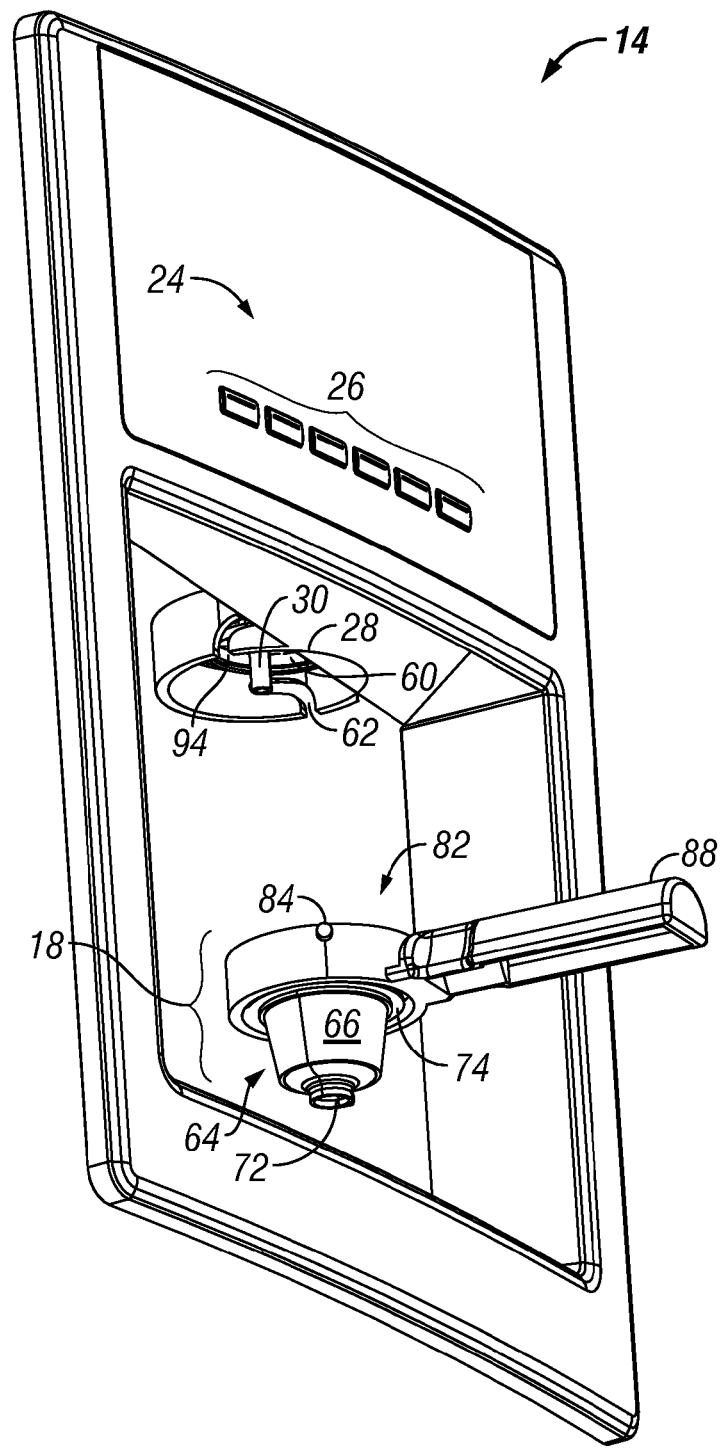
FIG. 6C is another illustration of the liquid enhancement device and liquid enhancement device holder joined together prior to securing to the liquid enhancement device interface on the indoor dispenser according to an exemplary embodiment of the present invention.
Figure 6D:
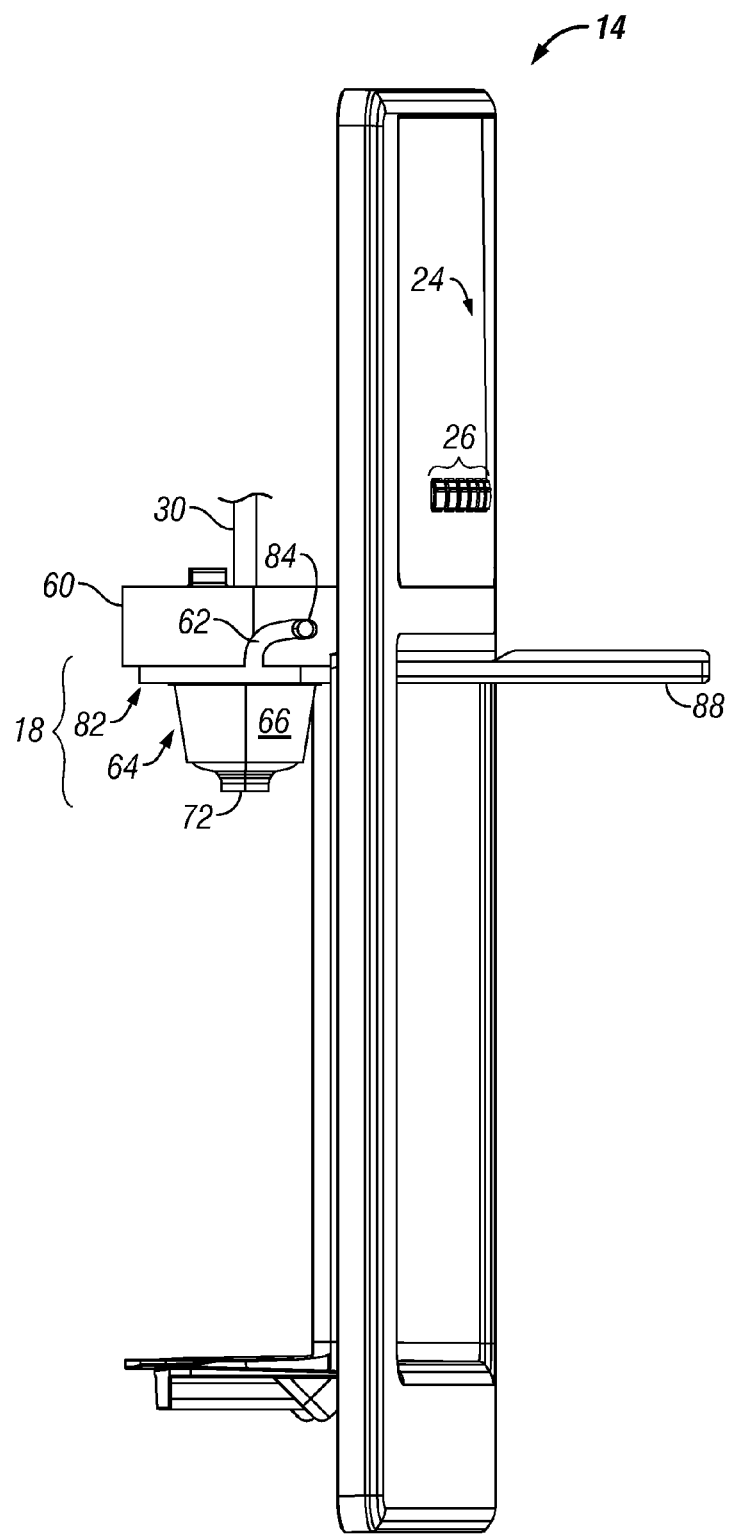
FIG. 6D is a side elevation view of the liquid enhancement device attached at the liquid enhancement device interface using a liquid enhancement device holder according to an exemplary embodiment of the present invention.
Figure 10A:
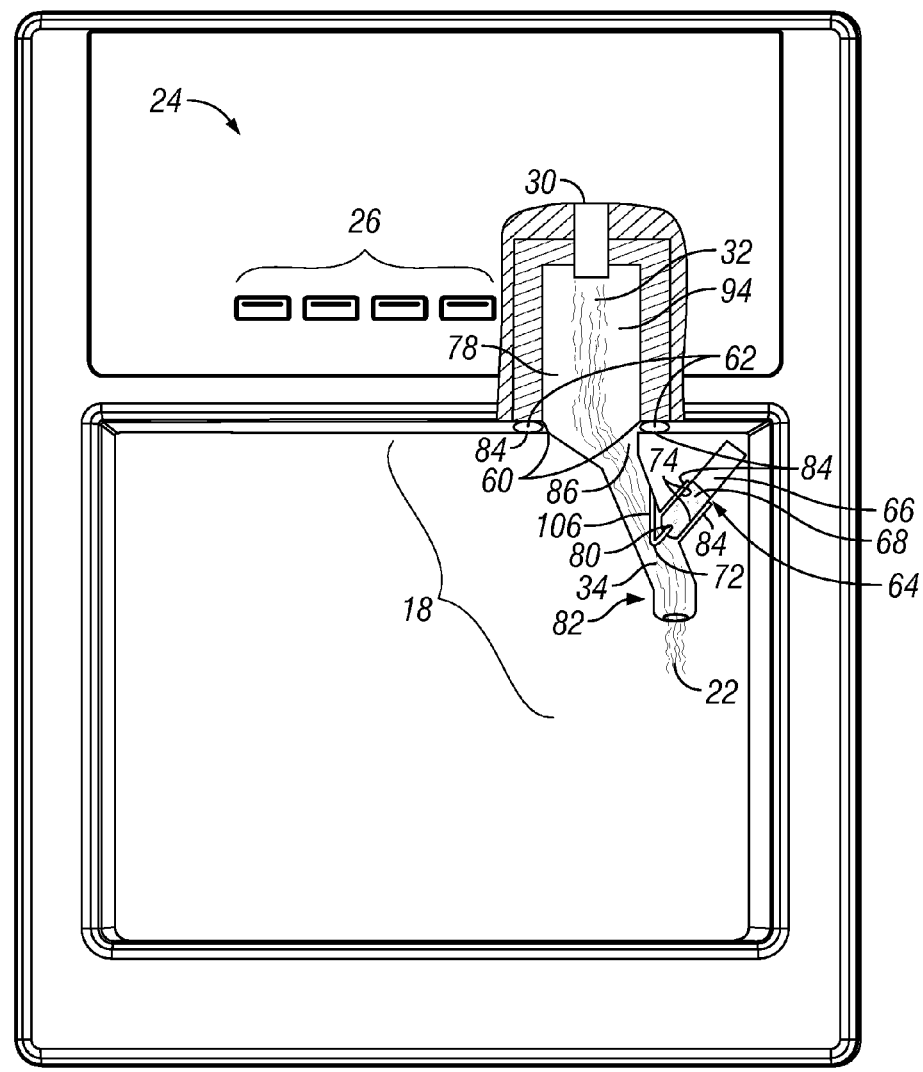
FIG. 10A is a front elevation view of the indoor dispenser having a liquid enhancement device and a liquid enhancement device holder attached at the liquid dispenser outlet of the indoor dispenser according to an exemplary embodiment of the present invention.
Figure 10B:
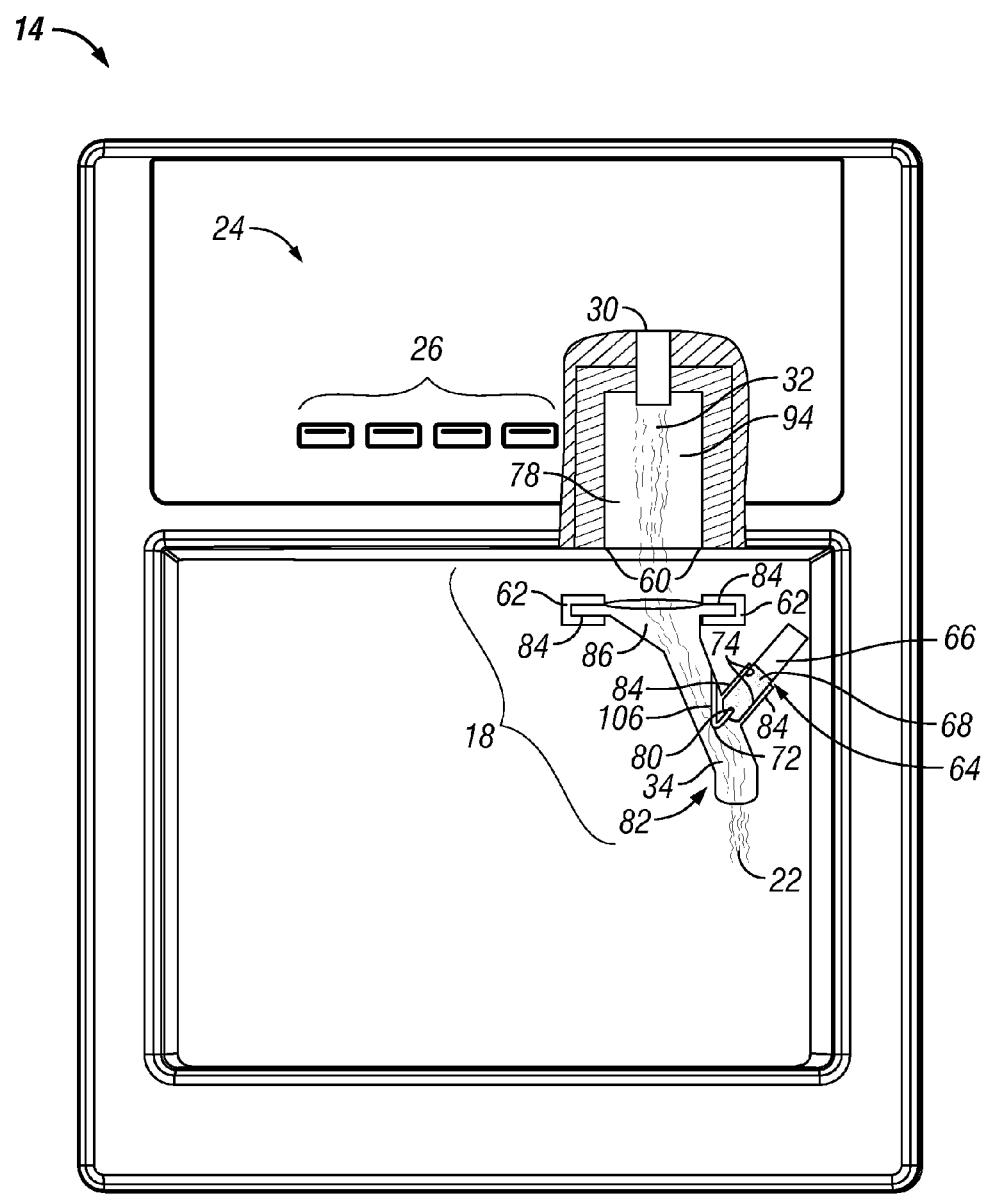
FIG. 10B is a front elevation view of the indoor dispenser with a liquid enhancement device secured within a liquid enhancement device holder that is secured beneath the liquid dispensing outlet of the indoor dispenser according to an exemplary embodiment of the present invention.

FIG. 6A illustrates another exemplary aspect of the present invention. Like earlier illustrated aspects of the present invention, indoor dispenser 14 includes a cavity 94 providing a place for an air buffer to reside to minimize potential for back contamination of liquid dispensing system 16 associated with refrigerator 10. A liquid enhancement device interface 60 is provided where cavity 94 opens into indoor dispenser 14 at dispensing outlet area 28. Like previous aspects, liquid enhancement system 18 is received in connected about liquid enhancement device interface 60 at the mouth of cavity 94 in indoor dispenser 14. As best illustrated in FIGS. 6B-D and 7A-B, liquid enhancement device interface 60 includes one or more cooperative attachments interfaces 62. FIGS. 6B-D illustrate one aspect of the present invention wherein cooperative attachment interface 62 is a quarter turn geometry, such as a groove, configured into liquid enhancement device interface 60. Corresponding cooperating attachment interfaces 84 are configured into liquid enhancement device holder 82. Liquid enhancement device 82 includes a cavity 86 for receiving and housing liquid enhancement device 64 as best illustrated in FIG. 6C. Liquid enhancement device holder 82 may also include gripping and handling means such as handle 88 to allow for ease of handling and manipulating liquid enhancement device holder 82 into mating connection with liquid enhancement device interface 60 and indoor dispenser 14 as best illustrated in FIG. 6D. Seals maybe provided for interfaces between liquid enhancement device 64 and liquid enhancement device holder 82 as well as between liquid enhancement device holder 82 and liquid enhancement device interface 60 to provide an air-tight seal to facilitate operation of liquid enhancement device 64 using the pressure of liquid dispensed from liquid dispensing outlet 30 in indoor dispenser 14. For example, liquid enhancement component 68 shown in FIG. 6A maybe sealed within container body 66 of liquid enhancement device 64 by a pressure rupturable seal 80. The pressure rupturable seal 80 may be configured to open as backpressure within cavity 94 increases to the pressure of liquid dispense from liquid dispensing outlet 30. Those skilled in the art can appreciate that liquid enhancement system 18 may also operate at ambient pressure and need not necessarily operate at the pressure of liquid dispensed from liquid dispensing outlet 30. For example, cavity 94 may be vented or open (as best illustrated in FIG. 10B) to communicate liquid from liquid dispensing outlet 30 to liquid enhancement device 64 at ambient pressure. In the case where liquid enhancement system 18 operates at ambient pressure, liquid enhancement device 64 may be configured so that seals 80 (for keeping liquid enhancement component 68 within container body 66 of liquid enhancement device 64) are manually removed or mechanically ruptured/punctured by a mechanical piercing geometry 106, such as illustrated in FIG. 10A-B. Liquid enhancement device 64, as previously discussed, may include any number of seals 84 to preserve the hygienical integrity of the liquid enhancement component 68 within container body 66 of liquid enhancement device 64. For example, liquid flow by or through liquid enhancement device 64 may be controlled and hygienical integrity of liquid enhancement component 68 within container body 66 of liquid enhancement device 64 preserved by a manually openable seal, a pressure rupturable seal, an adapter puncturable seal, a one-way valve, or any combination of the aforementioned seals or valves.

It should be appreciated at this point that indoor dispenser 14 includes liquid enhancement device interface 60 for interfacing with some cooperating attachment interface either provided on liquid enhancement device 64 or liquid enhancement device holder 82 whereby liquid enhancement device 64 is received and secured about liquid dispensing out 30 and indoor dispenser 14 so that liquid dispensed from liquid dispensing outlet 30 may be communicated into liquid enhancement device 64 to create an enhanced liquid stream 22 to provide an enhanced beverage 20 for drinking. Thus, liquid enhancement device 64 may include its own cooperative attachment interface 74, as shown in FIG. 3D, or be attached to liquid enhancement device interface 60 using liquid enhancement device holder 82.

Figure 5A:
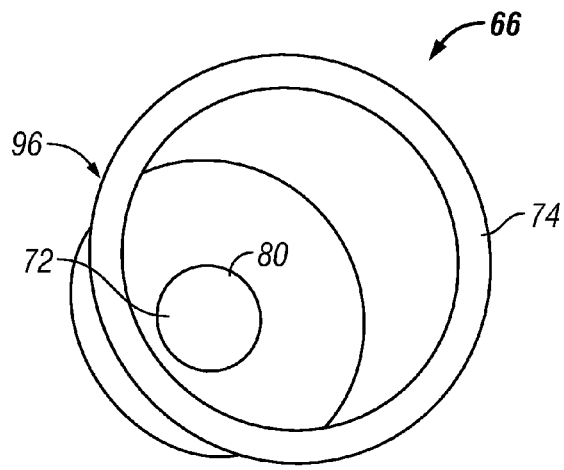
FIG. 5A illustrates a top portion of the container body for the liquid enhancement device according to an exemplary embodiment of the present invention.
Figure 5B:
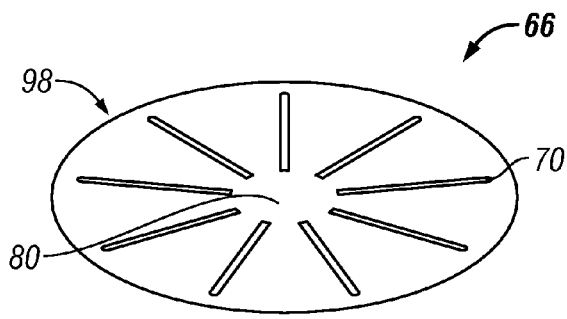
FIG. 5B illustrates a bottom portion of the container body of the liquid enhancement device according to an exemplary embodiment of the present invention.
Figure 5C:
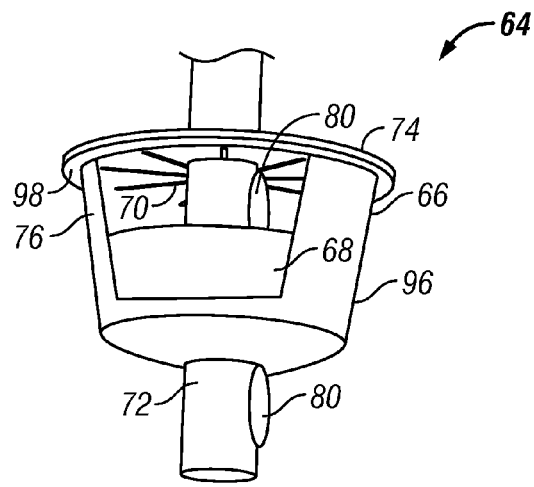
FIG. 5C provides a working illustration of the liquid enhancement device according to an exemplary embodiment of the present invention.

FIG. 6A illustrates cavity 94 existing in indoor dispenser 14. Those skilled in the art can appreciate that cavity 94 need not exist or be configured only in indoor dispenser 14 but may also be configured into liquid enhancement device holder 82 like cavity 86 illustrated in FIG. 6D to provide a buffer zone for separating enhanced liquid, liquid enhancement component 68, and other potential contamination materials from liquid dispensing outlet 30 in indoor dispenser 14 to minimize the potential for back contamination of the dispensing system 16 in refrigerator 10. As previously indicated, indoor dispenser 14 may include a user interface 24 having a plurality of controls 26 to control liquid dispensing system 16 and liquid enhancement system 18 to control conditioning, liquid enhancement levels and dispensing of individually conditioned liquid streams from the plurality of liquid conditioning components 38 at the liquid dispensing outlet in refrigerator 10. As best illustrated in FIGS. 5A-C, liquid enhancement device 64 may include a top 98 and bottom 96 joined to form a sealed container body 66 housing liquid enhancement components 68 at a pressure above atmospheric pressure such that when seal 80 on outlet 72 of liquid enhancement device 64 is pierced or ruptured by a mechanical piercing geometry, such as mechanical piercing geometry 106 illustrated in FIGS. 10A-B, liquid enhancement component 68 is forced out of container body 66 to combine with enhanced liquid stream 22 dispensed from liquid dispensing outlet 30 to provide an enhanced beverage 20 for drinking.

Figure 7A:
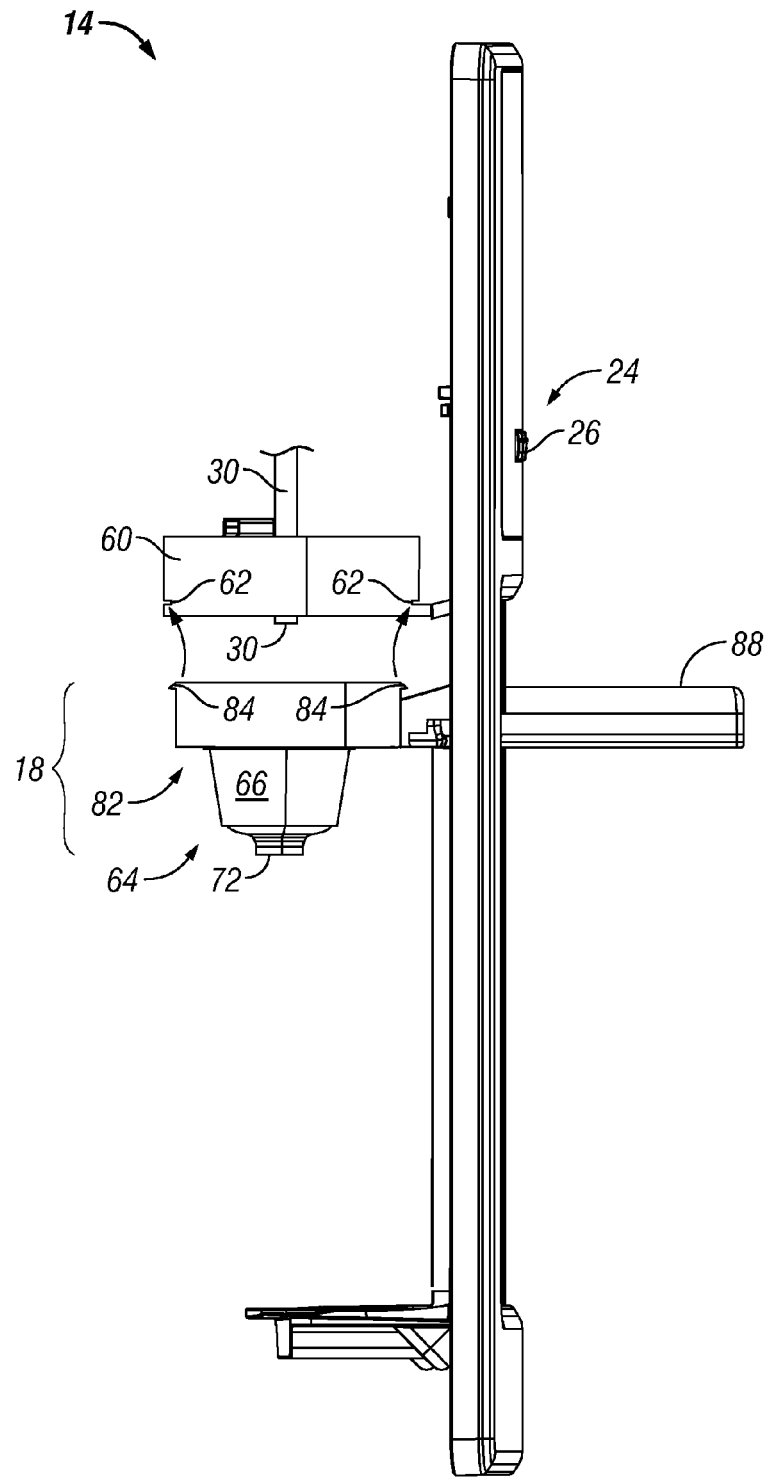
FIG. 7A illustrates alternative cooperative attachment interface on the liquid enhancement device interface and liquid enhancement holder for securing the liquid enhancement device to the indoor dispenser according to an exemplary embodiment of the present invention.
Figure 7B:
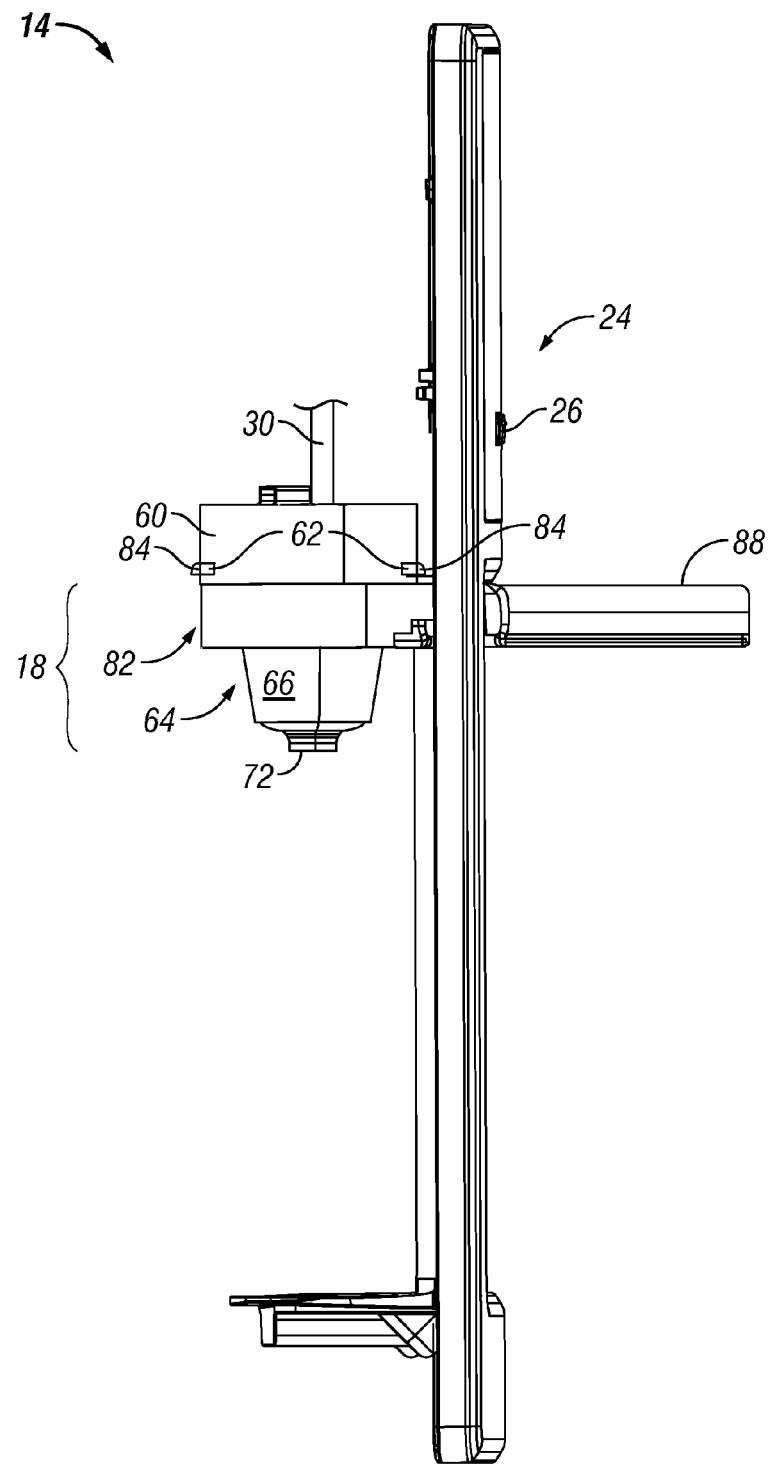
FIG. 7B is a side elevation view of the liquid enhancement device holder attached to the liquid enhancement device interface to secure the liquid enhancement device to the indoor dispenser according to an exemplary embodiment of the present invention.

Like FIGS. 6A-B, FIGS. 7A-B illustrate another aspect of the present invention. FIGS. 6A-B illustrate one aspect of the present invention wherein liquid enhancement device holder 82 is connected to liquid enhancement device interface 60 using cooperating attachment interface 62 and 84; by joining the two and turning liquid enhancement device holder 82 a quarter-turn attaches liquid enhancement device holder 82 to cooperating attachment interface 62 indoor dispenser 14. Those skilled in the art can appreciate that any number of connections maybe configured to join or secure liquid enhancement device holder 82 to liquid enhancement device interface 60 in indoor dispenser 14. FIGS. 7A-B illustrate another cooperative attachment interface 84 on liquid enhancement device holder 82 and corresponding cooperative attachment interface 62 on liquid enhancement device 60 for connecting 82 and 60 together. In this aspect of the present invention, cooperating attachment interface 84 configured into liquid enhancement device holder 82 are received within corresponding cooperative attachment interface 62 within liquid enhancement device interface 60 by inserting the prongs into corresponding apertures formed in liquid enhancement device interface 60. For example, the forward prong on liquid enhancement device holder 82 may be inserted into receiving geometry in liquid enhancement device interface 60 followed by snapping back prong on liquid enhancement device holder 82 into corresponding receiving geometry 62 in liquid enhancement device interface 60. The connection of the liquid enhancement device holder 82 and liquid enhancement device interface 60 could be accomplished by inserting one geometry in liquid enhancement device 82 into a receiving geometry in liquid enhancement device interface 60 and snapping the opposing geometry in liquid enhancement device holder 82 into the opposing geometry in liquid enhancement device interface 60. Those skilled in the art appreciate that FIGS. 6A-D and 7A-B don't limit the many number of connection interfaces that may be used to connect liquid enhancement device holder 82 to liquid enhancement device interface 60 in indoor dispenser 14. Those skilled in the art can appreciate that any number of cooperating attaching interfaces may be used. For example, cooperating attachment interfaces 62 and 74 may include, but are not limited to, a threaded union, a quick coupler union, a compression fit union, a slip joint union, a gasket fitting union, or any other union having the necessary architecture or geometry to permanently or temporarily hold cooperating attachment interfaces 62 and 74 together.

Figure 8A:
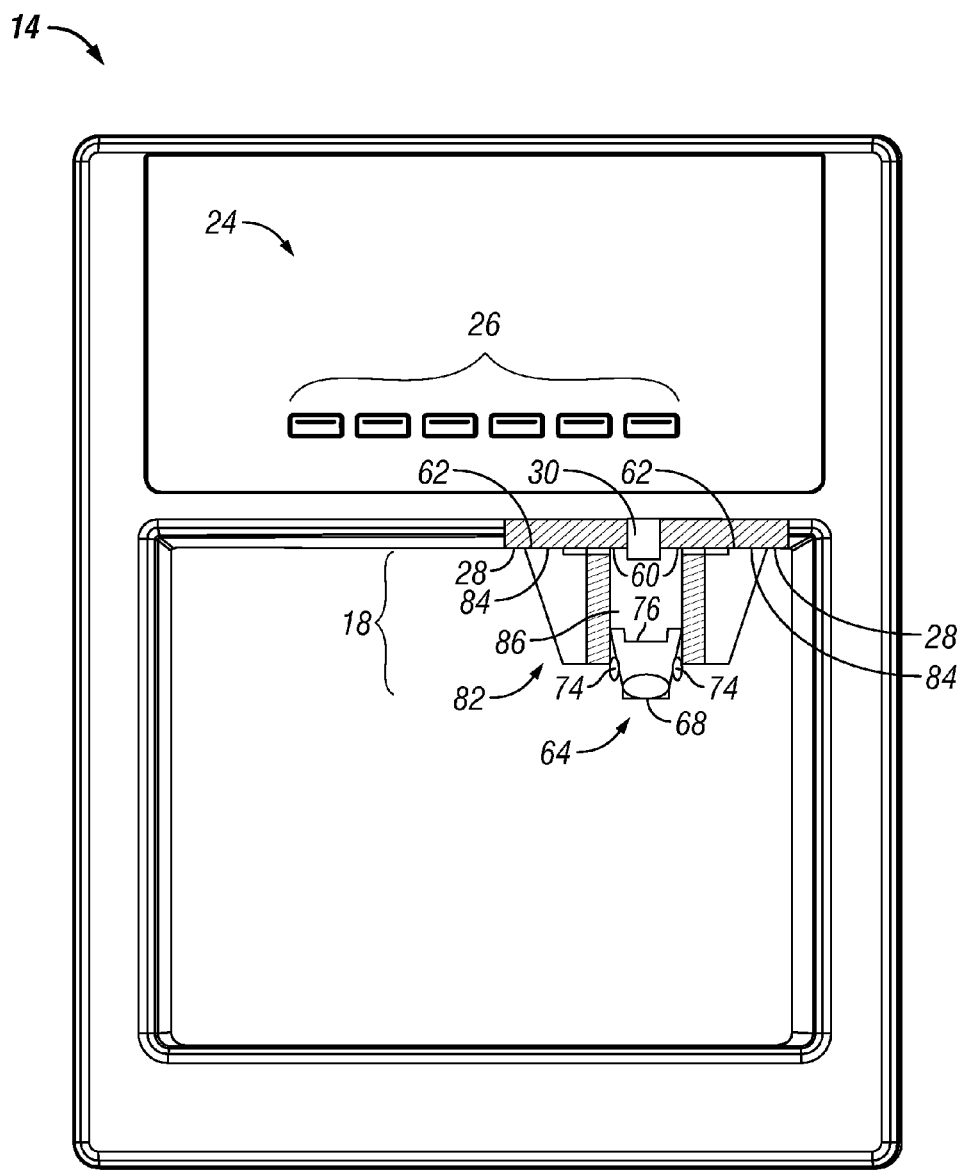
FIG. 8A is a front elevation view of the indoor dispenser configured with architecture to attach a liquid enhancement device holder for securing the liquid enhancement device to the indoor dispenser according to an exemplary embodiment of the present invention.
Figure 8B:
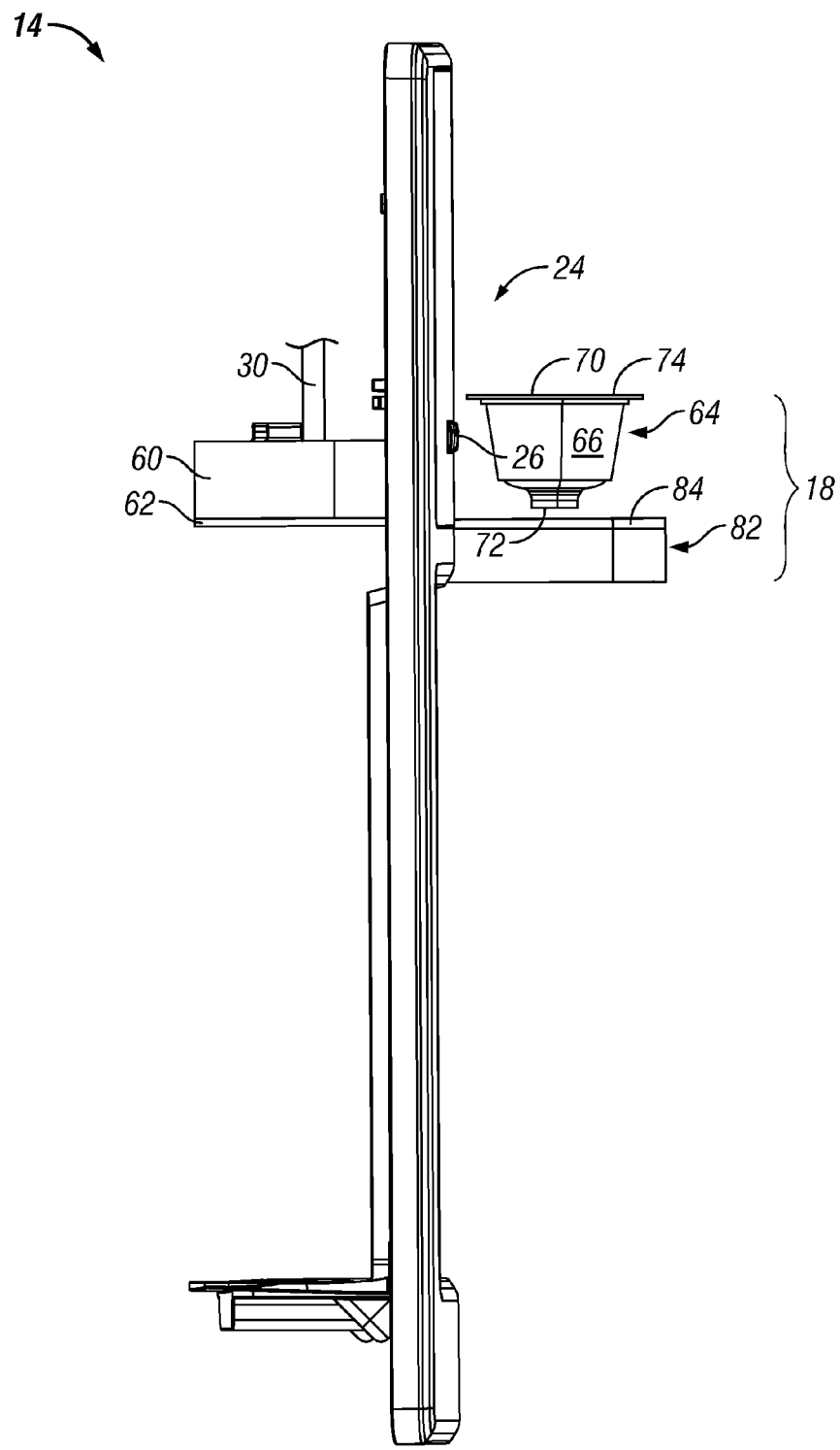
FIG. 8B is a side elevation view of the indoor dispenser configured with a liquid enhancement device holder adapted to receive and secure a liquid enhancement device relative to the liquid enhancement device interface about the indoor dispenser according to an exemplary embodiment of the present invention.
Figure 8C:
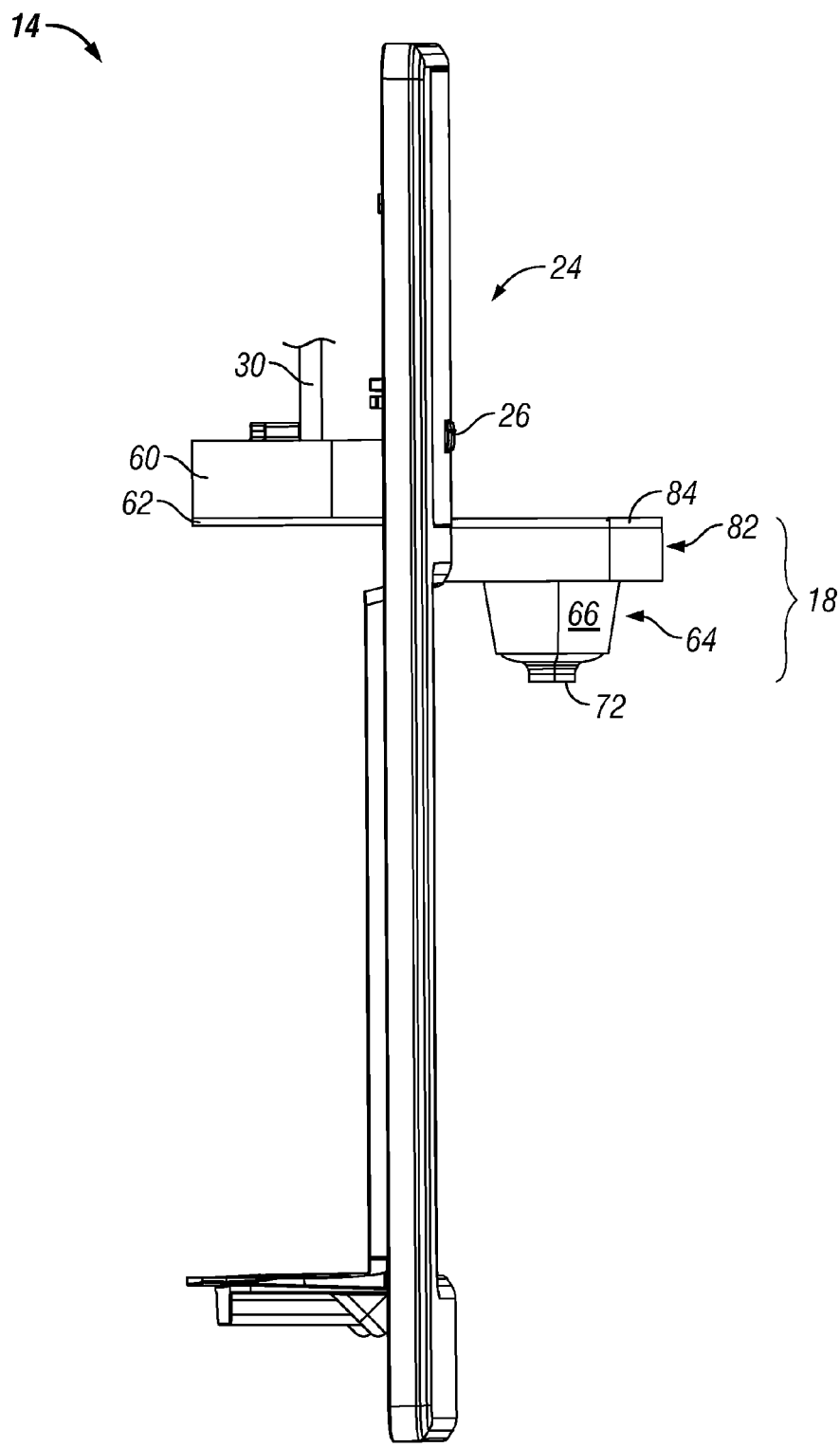
FIG. 8C is a side elevation view showing the liquid enhancement device received and secured within the liquid enhancement device holder according to an exemplary embodiment of the present invention.
Figure 8D:
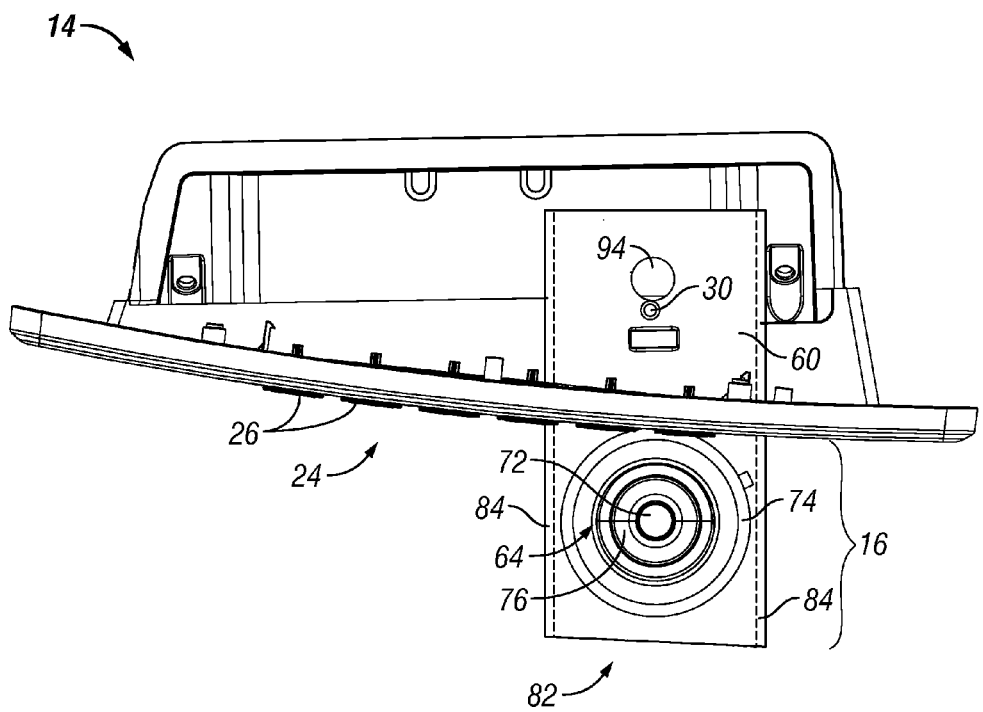
FIG. 8D is a plan view of the indoor dispenser illustrating the liquid enhancement device received and secured within the liquid enhancement device holder according to an according to exemplary embodiment of the present invention.
Figure 8E:
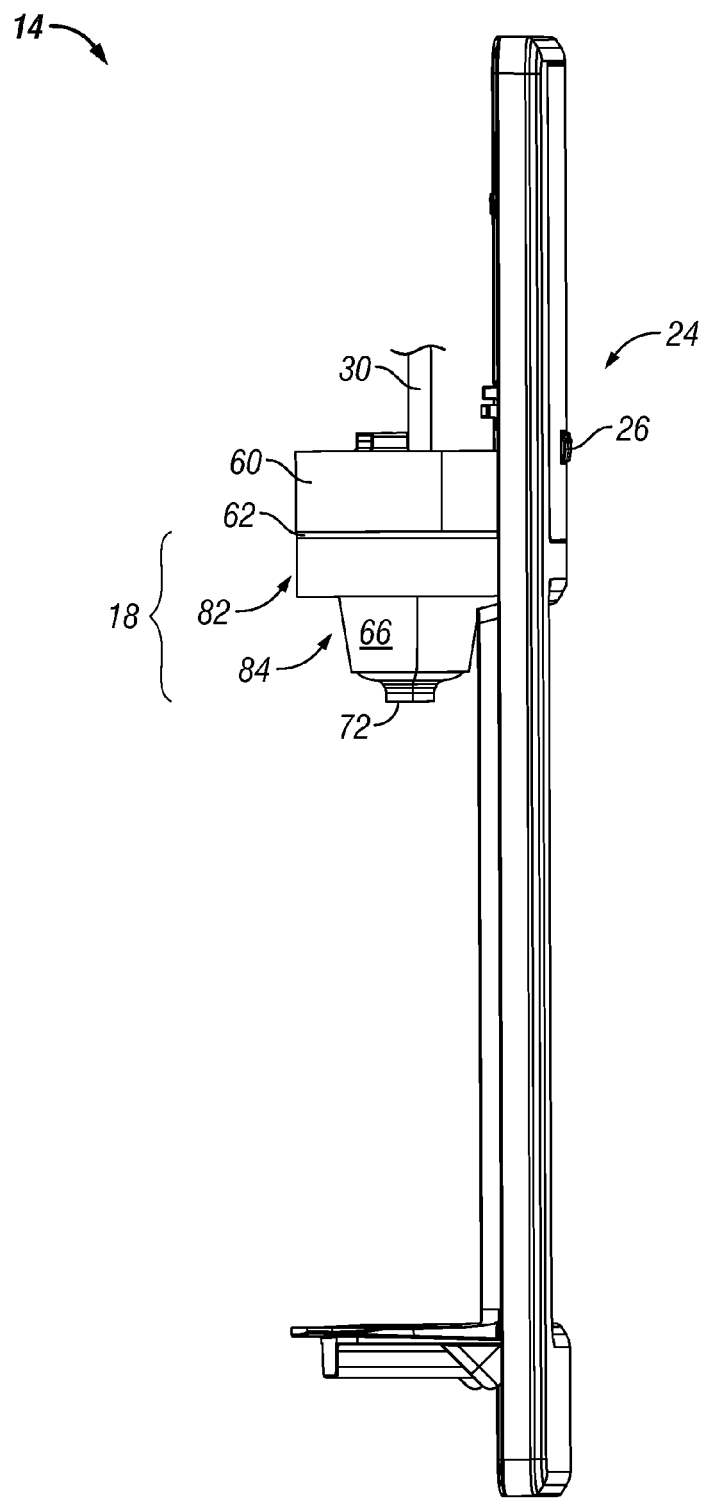
FIG. 8E is a side elevation view of the indoor dispenser with the liquid enhancement device holder and liquid enhancement device secured about the liquid enhancement device interface according to exemplary embodiment of the present invention.

FIGS. 8A-E illustrate another aspect of the present invention, the cavity provided for insuring that a buffer exists between enhanced liquid or liquid enhancement components 68 within liquid enhancement device 64 and liquid being dispensed from the liquid dispensing outlet 30 may reside in indoor dispenser 14 or a geometry or component attached about liquid dispensing outlet at dispensing outlet area 28 in indoor dispenser 14. In FIGS. 8A-E, cavity 86 is formed within liquid enhancement device holder 82. In this aspect of the present invention, liquid enhancement device 64 is secured within cavity 86 of liquid enhancement device holder 82. Cooperating attachment interface 74 on liquid enhancement device 64 and cooperating attachment interface 84 on liquid enhancement device holder 82 provide corresponding geometry for retaining liquid enhancement device 64 within liquid enhancement device holder 82, as best illustrated in FIGS. 8C and 8D. Similarly, cooperating attachment interfaces exists between liquid enhancement device interface 60 and liquid enhancement device holder 82. Cooperating attachment interface 62 on liquid enhancement device interface 60 and cooperating attachment interface 84 on liquid enhancement device holder 82 provide corresponding geometry to allow liquid enhancement device holder 82 to slide in and out. For example, cooperating attachment interface 84 on liquid enhancement device holder 82 may include slider railing geometry that is received in corresponding slider rail geometry 62 in liquid enhancement device interface 60 so that liquid enhancement device holder 82 holding liquid enhancement device 64 may slide in and out such that in the out position, liquid enhancement device 64 may be inserted and secured within liquid enhancement device holder 82 as best illustrated in FIG. 8C-8D, and in the in position liquid enhancement device 82 may be position directly beneath liquid dispensing outlet 30 in indoor dispenser 14, as best illustrated in FIG. 8E. The movement of liquid enhancement device holder 82 from the out position illustrated in FIGS. 8C-D to the in position illustrated in FIG. 8E puts liquid enhancement device 64 in position for receiving liquid dispensed from liquid dispensing outlet 28 for operating liquid enhancement system 18 at the pressure of liquid being dispensed from the liquid dispensing outlet or at ambient pressure. In the case where liquid enhancement system 18 is operated at the pressure of liquid being dispensed from the liquid dispensing outlet 30, seals maybe provided such that when liquid enhancement device holder 82 is in the in position as illustrated in FIG. 8E, a sealed cavity 86 is formed between liquid dispensing outlet 30 and liquid enhancement device 64, liquid enhancement device holder 82 and liquid enhancement device interface 60 and liquid enhancement device holder 82 and liquid enhancement device 64. In the case where liquid enhancement system 18 operates at ambient pressure, the connections between liquid enhancement device holder 82, liquid enhancement device 64 and cooperative attachment interface 62 may be open or vented to permit air to move in and out to allow liquid enhancement system 18 to operate at ambient pressure such that liquid dispensed from liquid dispensing outlet 30 does not significantly increase the pressure in cavity 86.

Figure 9A:
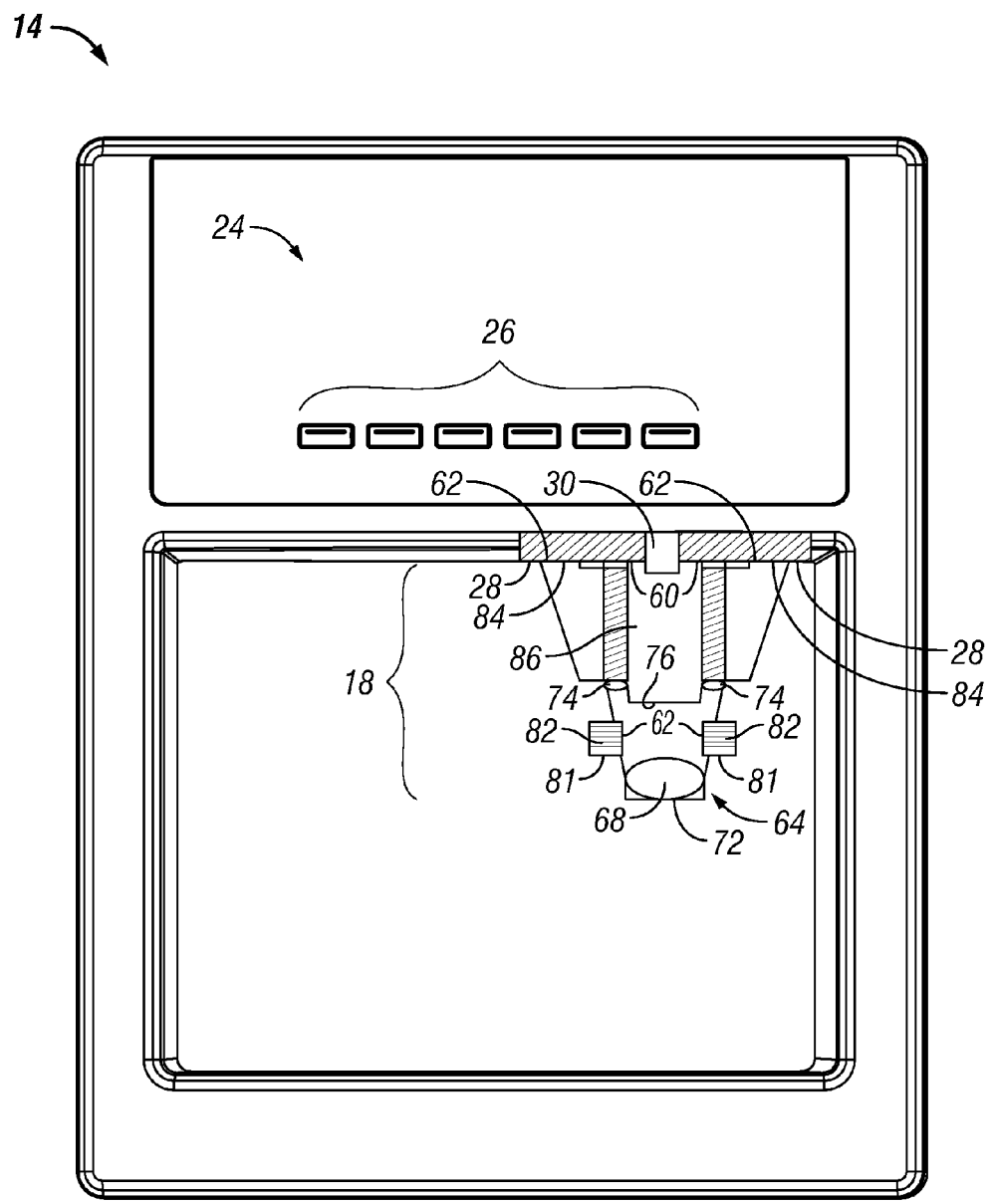
FIG. 9A is a front elevation view of the indoor dispenser with a liquid enhancement device holder for securing the liquid enhancement device about a cavity component down stream of the liquid dispensing outlet according to an exemplary embodiment of the present invention.
Figure 9B:
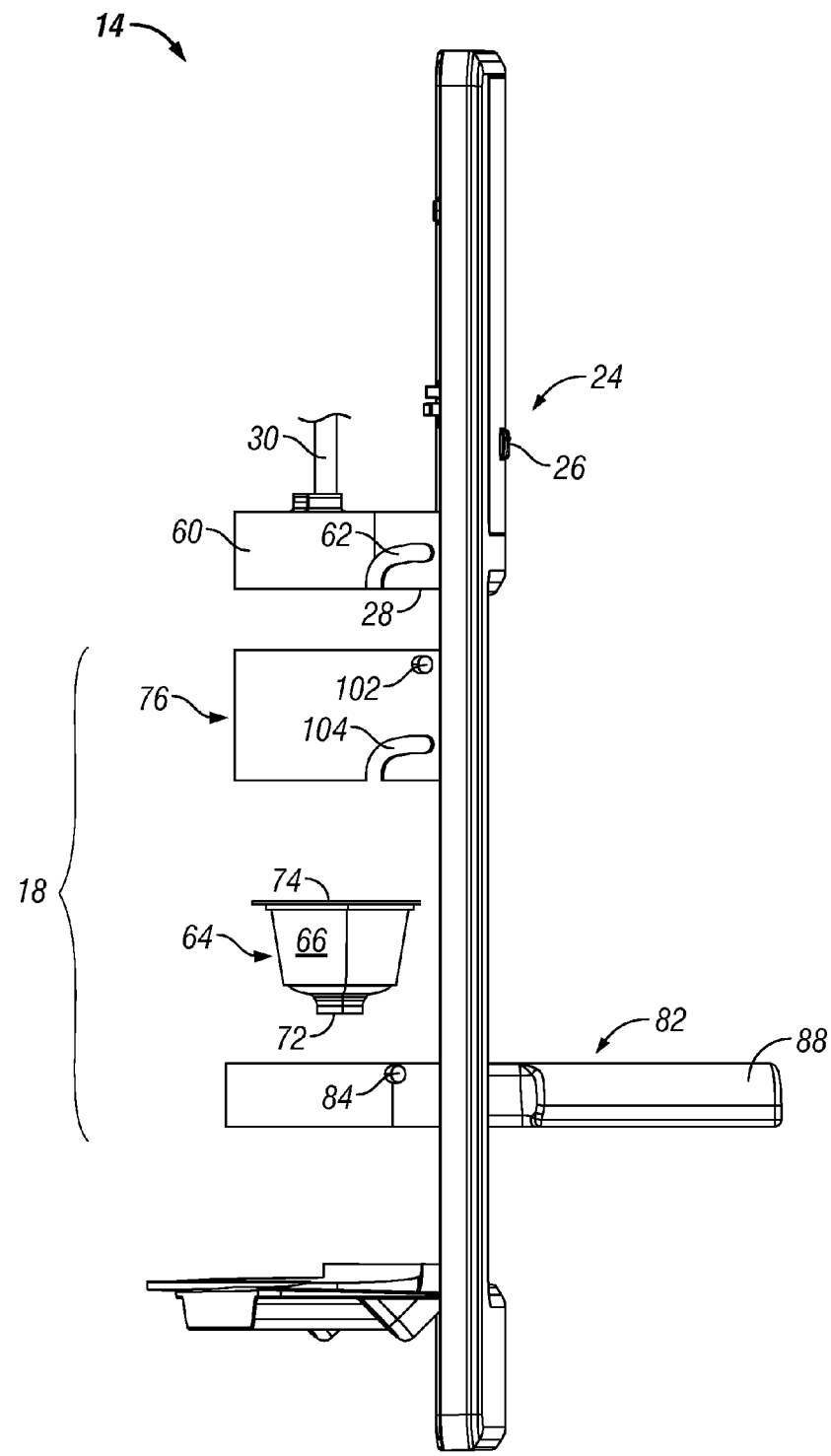
FIG. 9B is a side elevation view of the illustration shown in FIG. 9A with the cavity component, liquid enhancement device and liquid enhancement holder illustrated according to an exemplary embodiment of the present invention.
Figure 9C:
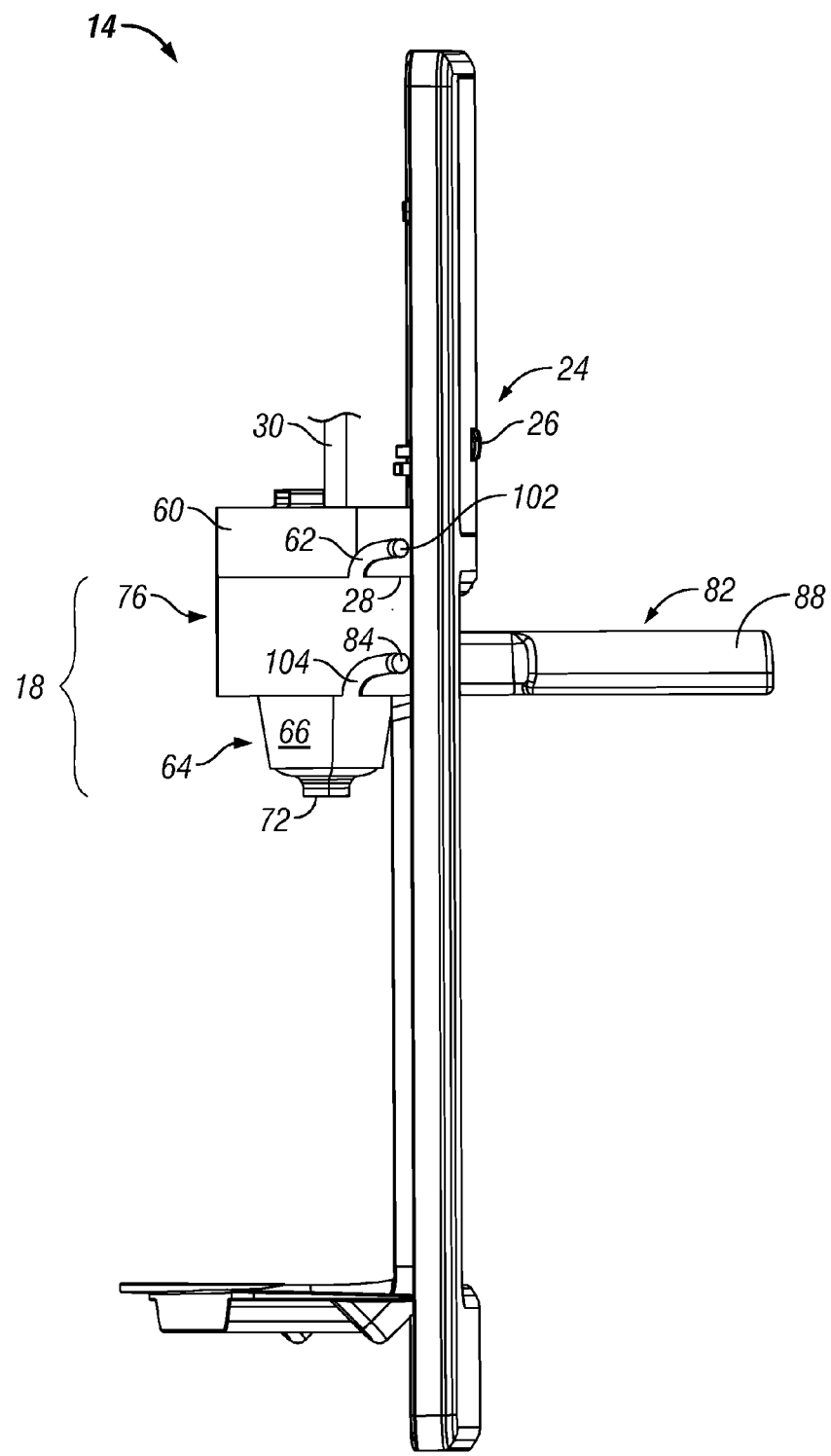
FIG. 9C is a side elevation view of the indoor dispenser illustrated in FIG. 9B with the liquid enhancement device interface and the liquid enhancement device holder attaching the liquid enhancement device to the cavity component according to an exemplary embodiment of the present invention.

FIGS. 9A-C illustrate another exemplary aspect of the present invention. In FIGS. 9A-C, a cavity geometry component 76 is used to provide a cavity between liquid enhancement device 64 and liquid enhancement device interface 60 to minimize the potential for back contamination of liquid dispensing system 16 in refrigerator 10. As best illustrated in FIG. 9B, cooperating attachment interface 102 on cavity 76 mates with corresponding cooperating attachment interface 62 in liquid enhancement device interface 60, as shown in FIG. 9C. Similarly, cooperating attachment interface 104 in cavity 76 mates with cooperating attachment interface 84 on liquid enhancement device 82, as also best illustrated in FIG. 9C. Similar to FIGS. 8A-E, liquid enhancement device 64 is retained within liquid enhancement device holder 82. For example, cooperating attachment interface 102 on cavity 76 may include a pin that is configured to be received within cooperating attachment interface 62, a quarter-turn groove, configured into liquid enhancement device interface 60. Similarly, cooperating attachment interface 104 in cavity 76 maybe a quarter-turn groove that receives cooperating attachment interface 84, such as a pin geometry, on liquid enhancement device holder 82. Liquid enhancement device holder 82, liquid enhancement device 64 cavity 76, and liquid enhancement device interface may include seals for operating liquid enhancement system 18 at a pressure commensurate with the pressure of liquid being dispensed from liquid dispensing outlet 30. Alternatively, as previously discussed, these same components may be connected such that liquid enhancement system 18 operates at ambient pressure whereby liquid within cavity 76 does not experience a significant increase in pressure (as air occupying cavity 76 is allowed to escape or vent out of liquid enhancement system 18 into the surrounding environment as liquid dispensed into cavity 76 forces air from cavity 76). Cavity component 76, like previously explained, provides a buffer region to separate potential contaminates from entering into the liquid dispensing system 16 associated with refrigerator 10. For example, the buffer 78 provided within cavity 76 prevents liquid combined with liquid enhancement component 68 or liquid enhancement component 68 alone from being drawn back up into liquid dispensing outlet 30 and ultimately contaminating liquid dispensing system 16 and refrigerator 10.

FIG. 10A illustrates another aspect of the present invention. In FIG. 10A liquid enhancement device holder 82 includes cooperating attachment interface 84 for securing liquid enhancement device holder 82 about cavity 78 in in-door dispenser 14 at dispensing outlet area 28. Cooperating attachment interface 84 is secured to cooperating attachment interface 62 in liquid enhancement device interface 60 using any number of the cooperating attachment means previously discussed. Liquid enhancement device holder 82 also includes a second set of cooperating attachment interface 84 corresponding with cooperating attachment interface 74 in liquid enhancement device 64 for receiving and securing liquid enhancement device 64 to liquid enhancement device holder 82. Unlike previous embodiments of the present invention, enhanced liquid stream 22 is dispensed from an outlet associated with liquid enhancement device holder 82 and not from outlet 72 associated with liquid enhancement device 64. Thus, the outlet in liquid enhancement device holder 82 controls the rate at which enhanced liquid stream 22 is dispensed from liquid enhancement device holder 82. Those skilled in the art can appreciate that the flow rate of enhanced liquid stream 22 from liquid enhancement device holder 82 can be controlled by reducing the diameter of the outlet/orifice to provide a flow restriction to enhanced liquid stream 22 being dispensed from the outlet/orifice in liquid enhancement device holder 82. Liquid enhancement device 64 is configured with outlet 72 having seal 80. A mechanical piercing geometry 106 is provided within liquid enhancement device holder 82 such that by inserting liquid enhancement device 64 into cooperating attachment interface 84 seal 80 at outlet 72 in liquid enhancement device 64 is ruptured or pierced. Liquid enhancement device 64 may be configured so that liquid enhancement component 68 included within container body 66 of liquid enhancement device 64 is sealed within container body 66 at a pressure above atmospheric pressure. Rupturing or piercing seal 80 at outlet 72 allows the pressure within container body 66 to evacuate liquid enhancement component 68 into liquid enhancement device holder 82 for dispensing in combination with liquid from liquid dispensing outlet 30 to create enhanced liquid stream 22. Alternatively, liquid enhancement device 64 may be configured such that liquid enhancement component 68 is drawn from within container body 66 by conditioned liquid stream 32 dispensed from liquid dispensing outlet 30 passing by outlet 72 after seal 80 is punctured or ruptured using mechanical piercing geometry 106. This may include providing a vent port in container body 66 or leaving container body 66 sealed whereby air is introduced through outlet 72 to replace liquid enhancement component 68 being dispensed from within container body 66 into liquid enhancement device holder 82. Cavity 94 in indoor dispenser 14 provides a buffer 78 for minimizing the potential for back contamination of liquid dispensing system 16 in refrigerator 10.

FIG. 10B provides an alternative embodiment to FIG. 10A. FIG. 10B illustrates liquid enhancement device holder 82 being positioned and held by cooperating attachment interface 62 at a position directly beneath liquid enhancement device interface 60 associated with dispensing outlet area 28 in indoor dispenser 14. In this aspect of the present invention, conditioned liquid stream 32 is dispensed from liquid dispensing outlet 30 and free falls into liquid enhancement device holder 82 directly beneath dispensing outlet area 28 associated with liquid enhancement device interface 60. The liquid enhancement system 18 operates at ambient pressure similar to the illustration shown in FIG. 10A. Liquid enhancement device 64 has a seal 80 covering outlet 72 of container body 66 which is punctured or ruptured by mechanical piercing geometry 106. Passing conditioned liquid stream 32 combines with or is effected by liquid enhancement component 68 dispensed from within container body 66 into liquid enhancement device holder 82 to dispense from the outlet/orifice in liquid enhancement device holder 82 as an enhanced liquid stream 22 to provide an enhanced beverage 20 (shown in FIG. 2) for drinking. Similar to FIG. 10A, a buffer 78 is provided between the liquid dispensing outlet 30 and potential contaminants existing within liquid enhancement device holder 82 to prevent such contaminants from being drawn back up into liquid dispensing outlet 30 and subsequently contaminating liquid dispensing system 16 in refrigerator 10. In the present aspect according to FIG. 10B, buffer 78 includes the area provided within cavity 94 as well as the gap separating the liquid enhancement device interface 60 and liquid enhancement device holder 82.

Figure 11A:
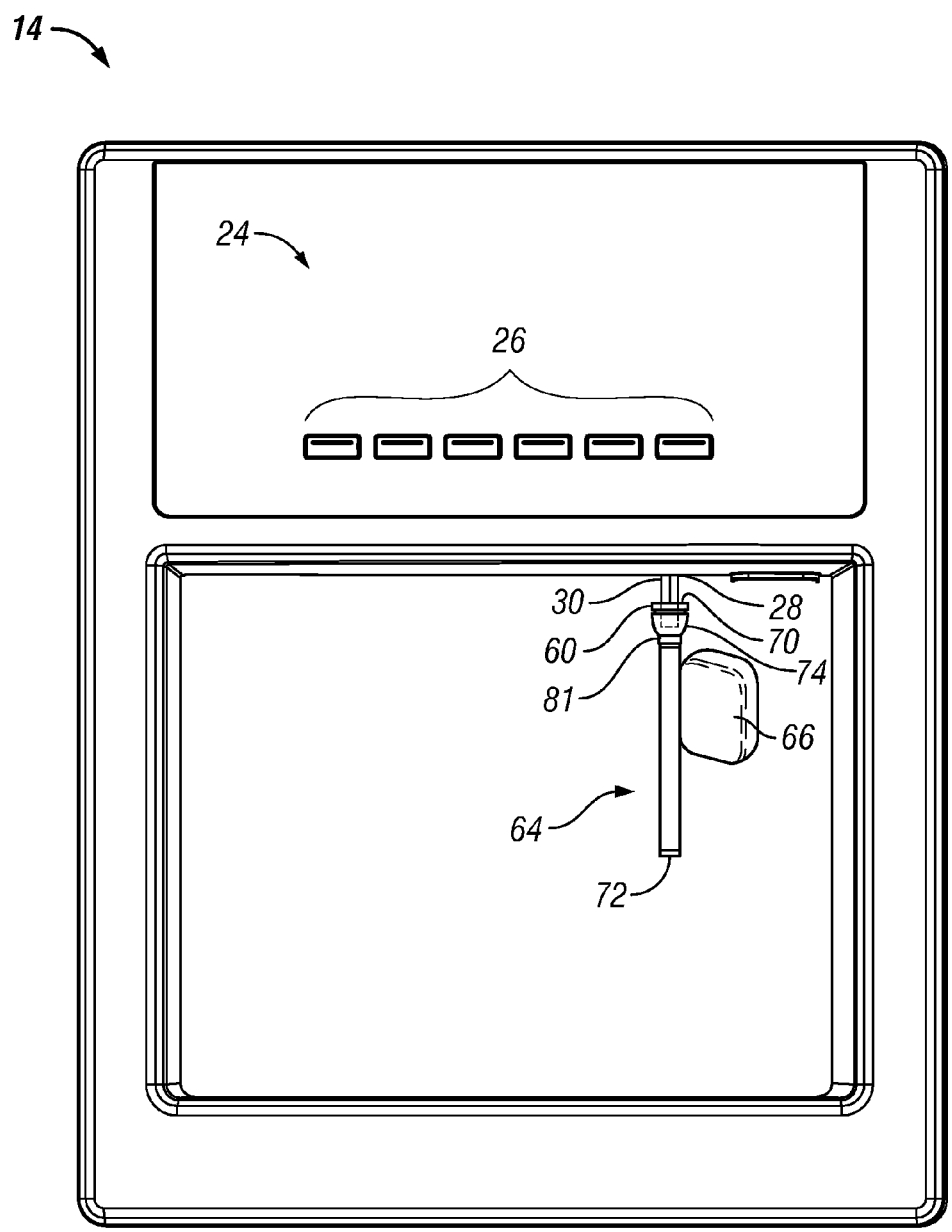
FIG. 11A is the front elevation view of the indoor dispenser with a liquid enhancement device secured to the liquid dispensing outlet according to an exemplary embodiment of the present invention.

FIG. 11A illustrates another aspect of the present invention. FIG. 11A illustrates a liquid enhancement device having a container body 66 for holding liquid enhancement component 68. Inlet 70 of liquid enhancement device 64 includes cooperating attachment interfaces 74. Cooperating attachment interfaces 74 are configured to secure liquid enhancement device 64 about liquid dispensing outlet 30. In this embodiment it could be said that the liquid enhancement device interface 60 is the outer periphery around liquid dispensing outlet 30 (where liquid dispensing outlet 30 is likely a rubber or plastic tube) which extends from indoor dispenser 14 for dispensing liquid there from at or near the dispensing outlet area 28. As best illustrated in FIG. 11C, cooperating attachment interface 74 consists of a number of varying diameter rungs. For example, in one aspect of the present invention, a first rung having a larger diameter, a second rung having an intermediate diameter and a third rung having a smallest diameter are provided. The differing sized rungs provide cooperating attachment interface 74 for securing liquid enhancement device 64 to different size liquid dispensing outlets 30 which may vary depending upon the size of tubing used for liquid dispensing outlet 30. Cooperating attachment interface 74 is configured to seal inlet 70 of liquid enhancement device 64 to liquid dispensing outlet 30 to provide a sealed connection between the two. A valve 81 may be included within the liquid enhancement device 64 to control the flow of liquid through liquid enhancement device 64. For example, a duckbill valve may be included within liquid enhancement device 64 to control the flow of liquid dispensed from liquid dispensing outlet 30 through liquid enhancement device 64. According to one aspect of the present invention shown in FIG. 1A, liquid dispensed from liquid dispensing outlet 30 is passed by container body 66 having liquid enhancement component 68. Valve 81 is opened as pressure within liquid enhancement device 64 increases to a point whereby valve 81 is forced open and liquid passing by container body 66 combines with liquid enhancement component 68 or is affected by liquid enhancement component 68 to dispense as an enhanced liquid stream 22 from outlet 72 of liquid enhancement device 64. Like earlier aspects of the present invention, liquid enhancement component 68 may be drawn from container body 66 using a Venturi effect or by passing liquid streams past liquid enhancement component 68 to draw or create a low pressure area to induct liquid enhancement components 68 into the passing liquid stream to dispense as enhanced liquid stream 22 at outlet 72 of liquid enhancement device 64.

Figure 11B:
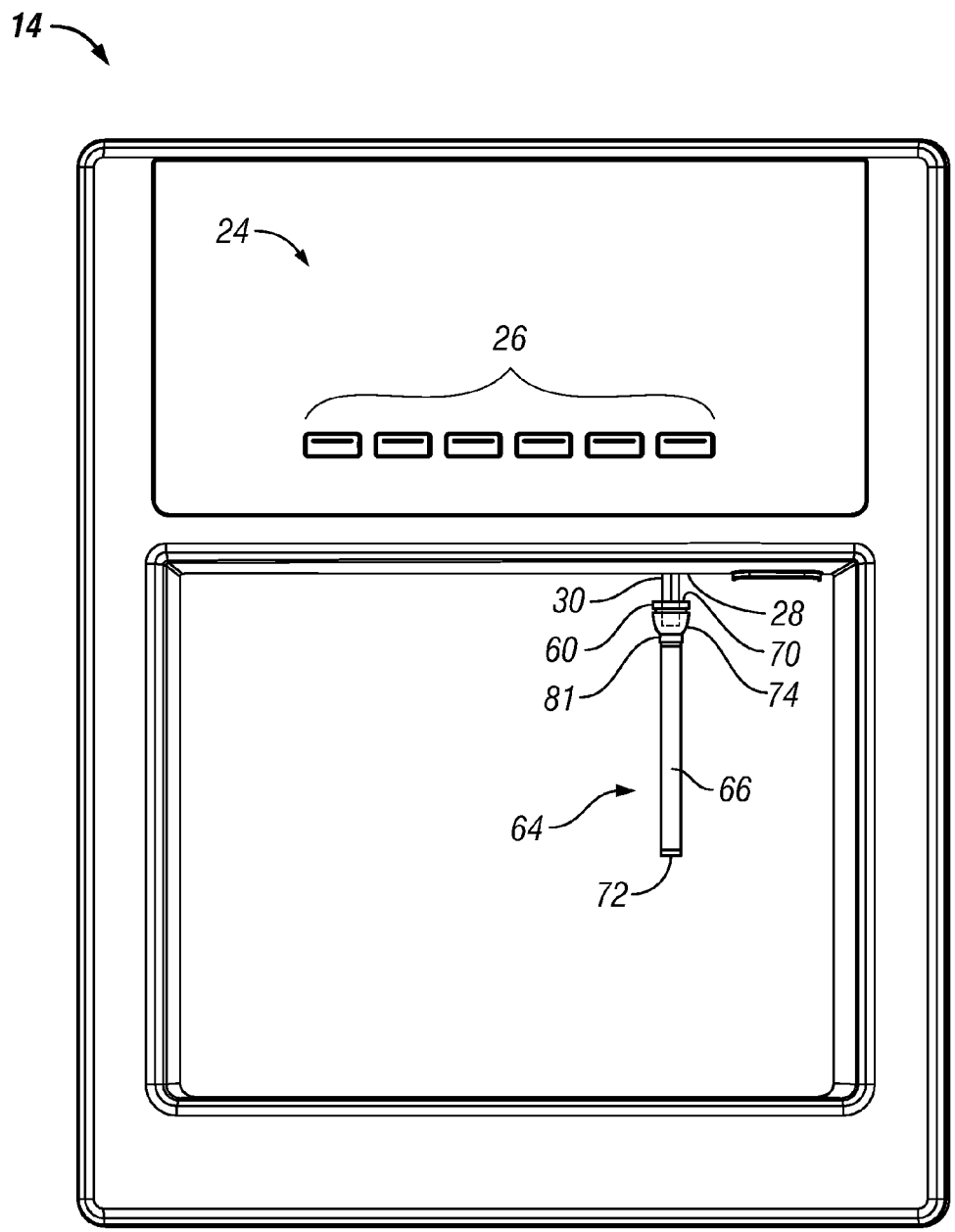
FIG. 11B is a front elevation view of the indoor dispenser with a liquid enhancement device attached to the liquid dispensing outlet according to an exemplary embodiment of the present invention.
Figure 11C:
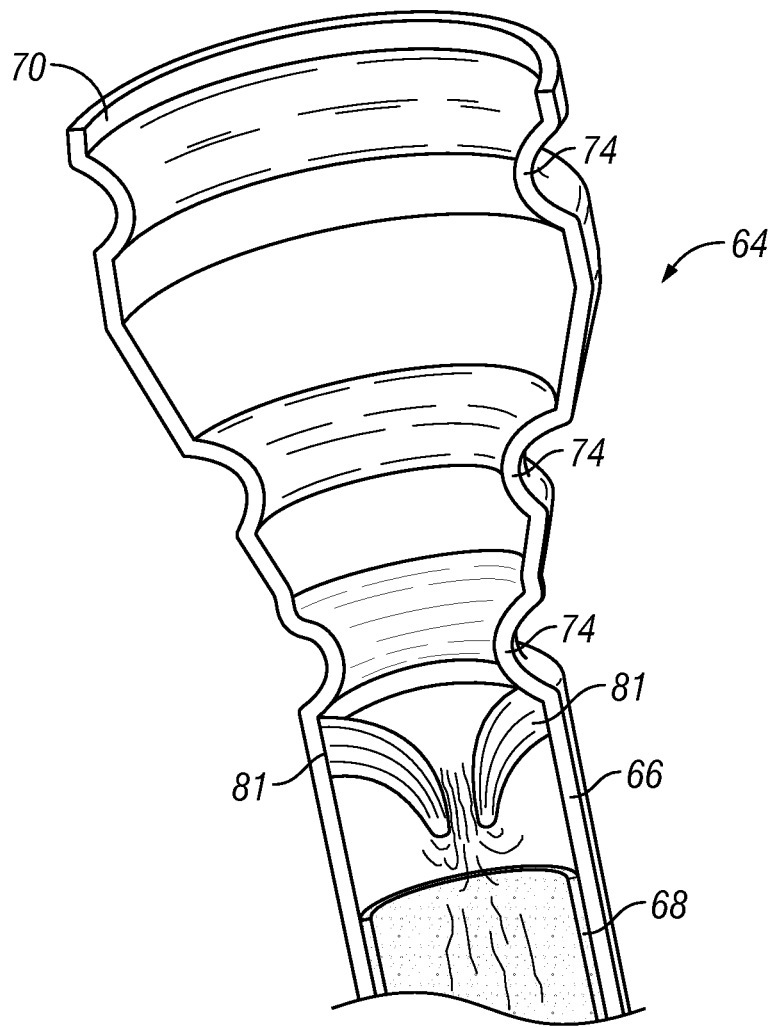
FIG. 11C is a cross-sectional view illustrating the cooperative attachment interfaces of the liquid enhancement device and valve used to control flow of conditioned liquid through the liquid enhancement device according to an exemplary embodiment of the present invention.

Similar to the embodiment of the present invention illustrated in FIG. 11A, FIG. 11B provides a liquid enhancement device having similar cooperating attachment interface 74 to connect liquid enhancement device 64 to liquid dispensing outlet 30. In this embodiment, liquid enhancement component 68 is contained within the same portion of liquid enhancement device 64 that is used for communicating the liquid stream from inlet 70 through liquid enhancement device 64 and out outlet 72. For example, liquid enhancement component 68 may be a dry liquid enhancement component 68 formed along the inner circumference or periphery of container body 66 such that passing liquid through liquid enhancement device dissolves liquid enhancement component 68 into the liquid stream to enhance the liquid stream to provide an enhanced beverage for drinking. Those skilled in the art can appreciate that liquid enhancement component 68 within liquid enhancement device 64 need not dissolve into a liquid stream but may affect the liquid stream in such a way as to provide an enhanced beverage at the outlet 72 of liquid enhancement device 64. Valve 81 in liquid enhancement device 64 controls and regulates the flow of liquid dispensed from liquid dispensing outlet 30 through container body 66 of liquid enhancement device 64. FIG. 11C illustrates valve 81 as a one-way, duckbill valve. Those skilled in the art can appreciate that many types of valves or specific material or geometries may be used to control and regulate the flow of liquid through liquid enhancement device 64. For example, liquid flow by or through liquid enhancement device 64 may be controlled and the hygienical integrity of enhancement components in liquid enhancement device 64 preserved by a puncturable seal, a rupturable seal, a detachable seal, a mechanical seal, a valve, or any combination of the beforementioned seals or valves.

Methods

A method for conditioning a liquid stream with a liquid dispensing system associated with a refrigerator, preparing and enhance beverage with a liquid and enhancement system using one or more of the individually conditioned liquid streams and minimizing the potential for back contamination of the liquid dispensing system is also disclosed. FIG. 1A illustrates a method of conditioning liquid introduced at liquid stream inlet 36 with a plurality of liquid conditioning components 38 and refrigerator 10. Conditioning of liquid stream introduced into refrigerator 10 through liquid stream inlet 36 may include one or more conditioning steps. For example, FIG. 1 illustrates a liquid filtering component 40 for filtering liquid introduced into refrigerator 10 at liquid stream inlet 36. Filtered liquid is communicated from liquid filtering component 40 to one or more of the plurality of remaining liquid conditioning components 38 through filter liquid line 42. Liquid heating component 44 heats liquid and is communicated through heated liquid line 46, liquid cooling component 48 cools liquid and is communicated through cooled liquid line 50 and carbonating component 52 carbonates the liquid and is communicated through carbonated liquid line 54 towards control valve 56. As previously discussed, the liquid conditioning component illustrated in FIGS. 1A and 1B are not limiting to the present invention. For example, the present invention contemplates including other conditioning components in refrigerator 10. For example, a liquid irradiating component maybe included in refrigerator 10 for irradiating liquid with UV or other light sources to provide in an irradiated liquid stream at valve 56 or liquid dispensing outlet 30. Additionally, the present invention contemplates including a liquid oxygenating component for providing oxygenated liquid at control valve 56 or liquid dispensing outlet 30. Still, other liquid conditioning components maybe included as part of the plurality of the liquid conditioning components 38 in refrigerator 10. For example, as illustrated in FIG. 1B, an ambient liquid line 100 may be provided for communicating ambient temperature liquid to control valve 56 or liquid dispensing outlet 30. Those skilled in the art can appreciate that the order may be changed or altered in which conditioned liquid streams are communicated between the plurality of liquid conditioning components 38 in refrigerator 10. A user interface 24 is provided on indoor dispenser 14. The user interface 24 includes a number of controls 26. Controls 26 maybe used to control, monitor or operate any number of the plurality of liquid conditioning components 38 associated with refrigerator 10. Controls 26 may also be used to control valve 56 or any other aspect of liquid dispensing system 16 associated with refrigerator 10 or liquid enhancement system 18. Conditioned liquid streams pass through or are communicated through liquid dispensing outlet 30 through conditioned liquid line 58. Conditioned liquid streams are presented at indoor dispenser 14 and dispensed into liquid enhancement system 18 through liquid dispensing outlet 30. Liquid enhancement system 18 maybe directly connected to dispensing outlet area 28 at liquid enhancement device interface 60 (as best shown in FIG. 2) or at a position proximate dispensing outlet area 28 (as best shown in FIG. 10B). Liquid enhancement system 18 may be connected to indoor dispenser 14 such that an air-tight environment is created between indoor dispenser 14 and liquid enhancement device 64, such as is illustrated in FIG. 4. Alternatively, liquid enhancement device 64 may be connected to or about the dispensing outlet area 28 and indoor dispenser 14 so that the connection between the two is vented allowing liquid enhancement device 64 to operate at ambient conditions, such as ambient pressure and temperature, such as is illustrated in FIG. 10B. In the broadest sense, any one of the individually conditioned liquid streams provided by the liquid dispensing system 16 in refrigerator 10 may be dispensed through liquid dispensing outlet 30 in indoor dispenser 14 through or past liquid enhancement device 64 to combine or effect conditioned liquid stream 32 with a liquid enhancement component 68 within liquid enhancement device 64 to dispense an enhanced liquid stream 22 to provide an enhanced beverage 20 for drinking as illustrated in FIG. 2.

According to another aspect of the present invention, a cavity is provided for creating a buffer between potential contaminants downstream of liquid dispensing outlet 30 that are at risk of being drawn back into liquid dispensing outlet 30 and subsequently contaminating liquid dispensing system 16 associated with refrigerator 10. FIGS. 3A-D and 10A-B illustrate one exemplary aspect of the present invention. Here, cavity 94 is formed in indoor dispenser 14 and enclosed by attaching liquid enhancement device 64 to indoor dispenser 14 about dispensing outlet area 28. FIGS. 8A-E illustrate another exemplary aspect of the present invention wherein cavity 86 is formed within liquid enhancement device holder 82. Cavity 86 is enclosed by inserting and securing liquid enhancement device 64 within liquid enhancement device holder 82 and securing liquid enhancement device holder 82 to liquid enhancement device interface 60 at dispensing outlet area 28 and in indoor dispenser 14. FIGS. 9A-C illustrate another exemplary aspect of the present invention. In FIGS. 9A-C, cavity 76 is a separate component from liquid enhancement device interface 60 and indoor dispenser 14, liquid enhancement device holder 82, and liquid enhancement device 64. As best illustrated by FIG. 9A, cavity 86 is formed in cavity component 76 to provide a buffer 78 to separate potential contaminants from being drawn back into liquid dispensing outlet 30 to minimize the potential for contaminating liquid dispensing system 16 in refrigerator 10. The present invention contemplates other means for minimizing the potential for back contamination of the liquid dispensing system 16 in refrigerator 10. For example, the potential for back contamination of liquid dispensing system 16 in refrigerator 10 may be minimized by separating potential containments from liquid dispensing outlet 30 using a puncturable seal, a rupturable seal, a detachable seal, a mechanical seal, a valve, or any combination of the aforementioned seals or valves. Similarly, the present invention contemplates minimizing the potential for contaminating the liquid dispensing system 16 in refrigerator 10 by: (a) providing a break in the individually conditioned liquid stream 32 between liquid dispensing outlet 30 and liquid enhancement components 68 and enhanced beverage 20; (b) providing a buffer 78 between liquid dispensing outlet 30 and liquid enhancement components 68 and enhanced beverage 20; (c) providing a valve 81 between liquid dispensing outlet 30 and liquid enhancement component 68 and enhanced beverage 20; (d) providing a geometry downstream of liquid dispensing outlet 30 adapted to trap a pocket of air or gas to separate liquid dispensing outlet 30 from liquid enhancement component 68 and enhanced beverage 20; or providing any combination of the aforementioned contamination minimization means.

The present invention contemplates means for controlling the flow of liquid dispensed from the liquid dispensing outlet 30 through liquid enhancement device 34 prior to being dispensed as an enhanced liquid stream 22 to provide an enhanced beverage 20. For example, the present invention contemplates controlling flow of conditioned liquid stream 32 from liquid dispensing outlet 30 by or through liquid enhancement device 64 and or flow of liquid enhancement components 68 from liquid enhancement device 64 using a manually openable seal, a pressure rupture seal, an adapter puncturable seal, a one-way valve, or any combination of the aforementioned seals or valves.

The present invention contemplates various means of connecting or securing liquid enhancement device 64 about, proximately to, relative to or secured directly to liquid dispensing outlet 30 at dispensing outlet area 28 in indoor dispenser 14. For example, the methods of the present invention include the steps of enclosably communicating one or more of the individually conditioned liquid streams 32 from liquid dispensing outlet 30 through or by liquid enhancement device 64 by providing: (a) cooperating attachment interfaces on liquid enhancement device 64 and liquid enhancement device interface 60 to connect the two together to secure liquid enhancement device 64 about liquid dispensing outlet 30; (b) cooperating attachment interfaces on liquid enhancement device interface 60 and a liquid enhancement device holder 82 to connect the two together to secure liquid enhancement device 64 about liquid dispensing outlet 30; or, (c) cooperating attachment interfaces on liquid enhancement device 64 and liquid dispensing outlet 30 to connect the two together. Further methods of the present invention include the steps of securing the cooperating attachment interfaces by: (a) threading the attachment interfaces together; (b) snapping the attachment interfaces together; (c) coupling the attachment interfaces together; (d) hooking the attachment interfaces together; (e) clamping the attachment interfaces together; (f) clipping the attachment interfaces together; or, (g) pressure fitting the attachment interfaces together. FIGS. 3C and 3D illustrate one exemplary aspect of the present invention wherein liquid enhancement device 64 includes cooperating attachment interface 74 that is received within corresponding cooperating attachment interface 62 in liquid enhancement device interface 60 of indoor dispenser 14. FIGS. 3C and 3D illustrate one specific embodiment wherein cooperating attachment interface 74 is a threaded interface that is matably received in corresponding threaded interface in liquid enhancement device interface 60. Thus, liquid enhancement device 64 maybe attached about liquid dispensing outlet 30 by threading liquid enhancement device 64 to the corresponding threads in indoor dispenser 14. FIGS. 6A-D illustrate another exemplary aspect of the present invention relating to securing liquid enhancement device 64 to indoor dispenser 14. Using liquid enhancement device holder 82, liquid enhancement device 64 may be secured to indoor dispenser 14. This is accomplished by securing liquid enhancement device 64 within cavity 86 of liquid enhancement device holder 82. Liquid enhancement device 64 has cooperating attachment interfaces 62 that are received in corresponding cooperating attachment interfaces 84 in liquid enhancement device holder 82 to thereby secure liquid enhancement device 64 within liquid enhancement device holder 82. For example, liquid enhancement device 64 may have a rim which functions as a cooperating attachment interface 62 which rests on a ledge within liquid enhancement device holder 82 which functions as a corresponding cooperating attachment interface 84 for receiving and securing liquid enhancement device 64 within liquid enhancement device holder 82. Liquid enhancement device holder 82 may be secured to liquid enhancement device interface 60 by moving cooperating attachment interface 84 or pins on liquid enhancement device holder 82 into corresponding grooves or cooperating attachment interface 62 on liquid enhancement device interface 60 and securing liquid enhancement device holder 82 with liquid enhancement device 64 to liquid enhancement device interface 60, as best illustrated in FIG. 6D. FIG. 7A through 7B illustrate another exemplary aspect of the present invention. Liquid enhancement device holder 82 has cooperating attachment interfaces 84 for securing in corresponding cooperating attachment interfaces 62 and liquid enhancement device interface 60. FIG. 7A-B illustrate cooperating attachment interface 84 in liquid enhancement device holder 82 as prongs that extend outwardly from the outer circumference or periphery of liquid enhancement device holder 82; cooperating attachment interface 84 or prongs are received within cooperating attachment interface 62 or apertures formed within liquid enhancement device interface 60. Liquid enhancement device holder 82 is secured to liquid enhancement device interface 60 by inserting one of the prongs and snapping the other prong into the opposite and corresponding aperture in liquid enhancement device interface 60. Thus, liquid enhancement device holder 82, by way of prongs, snaps into and is secured by corresponding apertures in liquid enhancement device interface 60. FIGS. 8A-C illustrate another exemplary aspect of the present invention wherein liquid enhancement device holder 82 functions as a sliding tray that moves in and out relative to indoor dispenser 14. As best illustrated in FIG. 8B, liquid enhancement device 64 is inserted into liquid enhancement device holder 82. Liquid enhancement device holder 82 and liquid enhancement device interface 60 have cooperating corresponding slider rails that allow for liquid enhancement device holder 82 to slide in and out relative to liquid enhancement device interface 60 in indoor dispenser 14. After loading liquid enhancement device 64 into liquid enhancement device holder 82, liquid enhancement device holder 82 may be moved into position underneath liquid dispensing outlet 30, as best illustrated in FIG. 8B. Sliding liquid enhancement device holder 82 into position underneath liquid dispensing outlet 30 may seal the liquid enhancement device 64 to liquid enhancement device interface 60 to create an air-tight environment for operating liquid enhancement device 64. Alternatively, as previously indicated, this environment may be vented or open to operate at ambient pressure, temperature, or other conditions. FIGS. 9A-C illustrate another exemplary aspect of the present invention wherein a cavity component 76 having cooperating attachment interfaces similar to those discussed in FIGS. 6A-D is used to attach liquid enhancement device 64 to cavity component 76 using liquid enhancement device holder 82 and subsequently attaching cavity component 76 to liquid enhancement device interface 60 in indoor dispenser 14. FIG. 10B illustrates another exemplary aspect of the present invention wherein liquid enhancement device holder 82 is secured proximate dispensing outlet area 28 about liquid dispensing outlet 30 by introducing cooperative attachment interface geometry on liquid enhancement device holder 82 into corresponding cooperating attachment interface 62 geometry on indoor dispenser 14 adapted to receive the corresponding cooperating attachment interface 84 geometry on liquid enhancement device holder 82. For example, any number of brackets or similar geometries may be formed on indoor dispenser 14 for receiving a corresponding geometry formed on liquid enhancement device holder 82 such that the two geometries secure liquid enhancement device holder 82 beneath dispensing outlet area 28 about liquid dispensing outlet 30. FIGS. 11A-C illustrate another exemplary aspect of the present invention wherein inlet 70 of liquid enhancement device 64 is configured with multiple cooperating attachment interfaces 74, such as varying diameter rungs, to accommodate the varying diameter of liquid dispensing outlet 30. Those skilled in the art can appreciate that the size of liquid dispensing outlet 30 or tubing may vary in diameter depending on the make and model of the refrigerator 10. Thus, liquid enhancement device 64 is connected to liquid dispensing outlet 30 by sliding the inlet 70 over liquid dispensing outlet 30 until the appropriate cooperating attachment interface 74 within inlet 70 secures to the corresponding outer periphery of liquid dispensing outlet 30.

As previously discussed, liquid enhancement device 64 may be attached to indoor dispenser 14 to create an air-tight environment between the two or a vented/open environment operating at ambient pressure, as shown in FIG. 10B. In the case where a sealed or air-tight environment is created between liquid enhancement device 64 and indoor dispenser 14, pressure resulting from dispensing liquid from liquid dispensing outlet 30 into liquid enhancement system 18 may be used to rupture a seal or open a valve separating liquid enhancement component 68 from liquid being dispensed from liquid dispensing outlet 30. FIGS. 4 and 5A-C illustrate one exemplary aspect of the present invention wherein liquid enhancement device 64 includes an inlet 70 and outlet 72 having a pressure rupturable seal 80. As liquid is dispensed from liquid dispensing outlet 30 into cavity 76, back pressure builds within the air-tight environment and causes seal 80 on inlet 70 and seal 80 on outlet 72 to rupture thereby allowing conditioned liquid stream 32 to combine with or be affected by liquid enhancement component 68 within container body 66 of liquid enhancement device 64 to thereby dispense from outlet 72 as an enhanced liquid stream 22 to provide an enhanced beverage 20 for drinking. FIG. 11C illustrates another exemplary aspect of the present invention wherein flow of conditioned liquid stream 32 from liquid dispensing outlet 30 through liquid enhancement device 64 is controlled and regulated by valve 81. Valve 81 is configured to open as pressure within liquid enhancement device 64 increases and subsequently closes when liquid is no longer being dispensed from liquid dispensing outlet 30 to prevent contaminants from being drawn back up into liquid dispensing system 16 in refrigerator 10.

The present invention contemplates any number of liquid enhancement components 68 being contained within a liquid enhancement device 64 that receives conditioned liquid stream 32 from liquid dispensing outlet 30 of indoor dispenser whereby the conditioned liquid stream 32 combines with or is affect by liquid enhancement component 68 within liquid enhancement device 64 to create or provide an enhanced liquid 34. The present invention contemplates imparting to or affecting conditioned liquid stream 32 with one or more liquid enhancement components 68 including a flavoring component, a soluble component, a non-soluble component, a powder, a liquid, a brew, a nutraceutical, a medicine, a mineral, a vitamin, an aroma, any combination of the aforementioned liquid enhancement components 68, or any combination of the aforementioned liquid enhancement components 68 wherein one liquid enhancement component 68 interacts or reacts with another or with the conditioned liquid stream 32. For example, FIG. 4 illustrates liquid enhancement component 68 as a liquid component stored in container body 66 of liquid enhancement device 64 which combines with conditioned liquid stream 32 to dispense from outlet 72 of liquid enhancement device 64 as an enhanced liquid stream 22 to provide an enhanced beverage 20 for drinking. FIG. 11C illustrates another exemplary aspect of the present invention wherein liquid enhancement component 68 is a powder substance embedded along the inner peripheral wall of container body 66 of liquid enhancement device 64 such that conditioned liquid stream 32 passing through liquid enhancement device 64 combines with or is affected by liquid enhancement component 68 to provide an enhanced liquid 34. According to another aspect of the present invention, liquid dispensing system 16 and liquid enhancement system 18 operate in conjunction with each other. For example, where liquid enhancement component 68 in liquid enhancement device 64 requires heated liquid, such as where liquid enhancement component 68 is a brew, liquid dispensing system 16 dispenses a heated liquid as the conditioned liquid stream 32 to be enhanced and dispensed as a brewed beverage. Similarly, if liquid enhancement component 68 is a syrup, liquid dispensing system 16 dispenses a carbonated liquid as the conditioned liquid stream 32 to be enhanced and dispensed as a carbonated, flavored beverage. In another example, if liquid enhancement component 68 is a vitamin and mineral liquid composition, liquid dispensing system 16 dispenses chilled or carbonated liquid as the conditioned liquid stream 32 (depending on the preference of the user input using controls 26 at user interface 24) to be enhanced and dispensed as a carbonated or chilled, vitamin and mineral enhanced beverage.

The present invention contemplates numerous ways of combining liquid enhancement component 68 with conditioned liquid stream 32 or affecting conditioned liquid stream 32 with liquid enhancement component 68. FIG. 4 illustrates one exemplary aspect wherein conditioned liquid stream 32 is combined with liquid enhancement component 68 within container body 66 of liquid enhancement device 64; this is accomplished by passing conditioned liquid stream 32 directly through liquid enhancement component 68. Those skilled in the art can appreciate that conditioned liquid stream 32 need not pass directly through liquid enhancement component 68 as illustrated in FIG. 4. FIGS. 10A-B illustrate another exemplary aspect of the present invention wherein conditioned liquid stream 32 is passed by outlet 72 of liquid enhancement device 64. Conditioned liquid stream 32 may be combined with or affected by liquid enhancement component 68 by drawing liquid enhancement component 68 out of liquid enhancement device 64 using a Venturi affect or passing conditioned liquid stream 32 past outlet 72 at a flow rate sufficient to draw liquid enhancement component 68 out of liquid enhancement device 64. Similarly, liquid enhancement device 64 may be prepackaged as a single serve unit having an internal pressure within container body 66 above atmospheric pressure such that when outlet 72 is opened or punctured, liquid enhancement component 68 is forced out of container body 66 into the passing conditioned liquid stream 32 to thereby combine or affect the conditioned liquid stream to provide an enhanced liquid 34.

Current embodiments of the present invention contemplate operating at pressures above atmosphere, such as in an air-tight environment formed by a sealed connection or an atmospheric pressure environment formed by a vented or open connection. The present invention further contemplates fluidly communicating one or more of the individually conditioned liquid streams 32 from liquid dispensing outlet 30 to liquid enhancement device 64 within: (a) a sealed or restricted enclosure operating at or near a pressure of the individually conditioned liquid stream 32 to rupture a sealed inlet 70 or outlet 72 of liquid enhancement device 64 to combine liquid enhancement component 68 with the individually conditioned liquid stream 32 to provide an enhanced beverage 20; (b) or a vented enclosure operating at or near ambient pressure and having means to pierce a sealed outlet of liquid enhancement device 64 to release a liquid enhancement component 68 into the individually conditioned liquid stream 32 to provide an enhanced beverage 20.

In another aspect, the present invention is not limited to minimizing the potential for back contamination within liquid dispensing system 16 by providing an air buffer separating contaminants from liquid dispensing outlet 30. The present invention contemplates minimizing the potential for contaminating liquid dispensing system 16 associated with refrigerator 10 by: (a) providing a break in the individually conditioned liquid stream 32 between liquid dispensing outlet 30 and liquid enhancement components 68 and enhanced beverage 20; (b) providing a buffer between liquid dispensing outlet 30 and liquid enhancement components 68 and enhanced beverage 20; (c) providing a valve 81 between liquid dispensing outlet 30 and liquid enhancement components 68 and enhanced beverage 20; (d) providing a geometry downstream of liquid dispensing outlet 30 adapted to trap a pocket of air or gas to separate liquid dispensing outlet 30 from the liquid enhancement components 68 and enhanced beverage 20; or, (e) providing any combination of the aforementioned means for minimizing contamination of liquid dispensing system 16 associated with refrigerator 10.

Those skilled in the art can appreciate that the present invention should not be construed as being limited only to refrigerators. For example the apparatuses and methods of the present invention could be used for enhancing conditioned liquid streams using the liquid enhancement device 64 by enhancing a conditioned liquid stream from a faucet, a countertop water dispenser, a tabletop water dispenser, water dispensing cabinet, a water bubbler, water dispensing cooler, an under-counter dispenser, or any like water dispensers.

The present invention contemplates numerous variations, options, and alternatives and is not limited to the specific embodiments described herein.

What is claimed is:

1. A method for conditioning at least one liquid stream with a liquid dispensing system associated with a refrigerator, preparing an enhanced beverage with a liquid enhancement system using one or more individually conditioned liquid streams and minimizing the potential for back contamination of the liquid dispensing system, the method comprising:
   providing a cabinet body defining an interior;
   providing at least one door for access to the interior, the door comprising a dispenser having an inlet adapted for fluid communication with an external liquid source and a dispensing outlet area proximate a liquid dispensing outlet and a liquid enhancement device interface about the liquid dispensing outlet at the dispensing outlet area;
   controlling temperature of the at least one liquid stream with a liquid cooling component to provide a cooled liquid stream and a liquid heating component to provide a heated liquid stream;
   removably attaching a liquid enhancement device at the liquid enhancement device interface, the liquid enhancement device having a liquid enhancement component and a liquid flow path;
   configuring the liquid flow path between:
      a. a flow through mode comprising passing the at least one liquid stream through the liquid flow path and the liquid enhancement component; and
      b. a flow by mode comprising passing the at least one liquid stream through the liquid flow path by the liquid enhancement component; and
   enhancing the at least one liquid stream at the liquid enhancement device interface for preparing the enhanced beverage at a pressure of the external liquid source.

2. The method of claim 1 further comprising the step of carbonating the liquid stream with a liquid carbonating component to provide a carbonated liquid stream as one of the individually conditioned liquid streams.

3. The method of claim 1 further comprising the step of filtering the at least one liquid stream with a liquid filtering component to provide a filtered liquid stream as one of the individually conditioned liquid streams.

4. The method of claim 3 further comprising the step of fluidly communicating the filtered liquid stream to the liquid cooling component and/or the liquid heating component.

5. The method of claim 3 further comprising the step of fluidly communicating the filtered liquid stream in a filtered liquid line, the cooled liquid stream in a cooled liquid line, and the heated liquid stream in a heated liquid line.

6. The method of claim 1 further comprising the step of fluidly communicating at least one of the individually conditioned liquid streams to a control valve associated with the refrigerator.

7. The method of claim 1 wherein the liquid enhancement device includes a container body with a sealed inlet and outlet housing the liquid enhancement component.

8. The method of claim 7 further comprising the step of communicating at least one of the individually conditioned liquid streams from the liquid dispensing outlet through the liquid enhancement device to combine or affect the conditioned liquid stream with the liquid enhancement component to prepare the enhanced beverage.

9. The method of claim 1 further comprising the step of closing off a cavity formed about the liquid dispensing outlet in the dispensing outlet area by attaching the liquid enhancement device to the liquid enhancement device interface.

10. The method of claim 9 further comprising the step of creating an air buffer in the cavity between the liquid dispensing outlet and enhanced liquid within the liquid enhancement device to minimize the potential for back contamination of the liquid dispensing system associated with the refrigerator.

11. The method of claim 1 further comprising the step of creating an air-tight seal between the liquid dispensing outlet of the refrigerator and the liquid enhancement device by securing the liquid dispensing outlet and the liquid enhancement device together to operate the liquid enhancement device at the pressure of the external liquid source.

12. The method of claim 11 further comprising the step of rupturing the seal on the inlet and outlet of the liquid enhancement device with back pressure resulting from dispensing the conditioned liquid stream to combine the liquid enhancement components with the conditioned liquid stream to dispense the enhanced beverage.

13. The method of claim 7 further comprising the step of securing the liquid enhancement device to the liquid enhancement device interface with a liquid enhancement device holder.

14. The method of claim 13 further comprising the step of closing off a cavity in the liquid enhancement device holder by attaching the liquid enhancement device to the liquid enhancement device interface using the liquid enhancement device holder.

15. The method of claim 1 further comprising the step of forming an air buffer in a cavity between the liquid enhancement device interface and enhanced liquid within the liquid enhancement device to minimize the potential for back contamination of the liquid dispensing system.

16. The method of claim 15 further comprising the step of controlling flow of the conditioned liquid stream by or through the liquid enhancement device and/or flow of liquid enhancement components from the liquid enhancement device using:
   a. a manually openable seal;
   b. a pressure rupturable seal;
   c. an adapter puncturable seal;
   d. a valve;
   e. a mechanical seal; or
   f. any combination of a-e.

17. The method of claim 7 further comprising the step of imparting to or affecting the conditioned liquid stream with one or more liquid enhancement components including:
   a. a flavoring component;
   b. a soluble component;
   c. a non-soluble component;
   d. a powder;
   e. a liquid;
   f. a brew;
   g. a nutraceutical;
   h. a medicine;
   i. a mineral;
   j. a vitamin;
   k. an aroma;
   l. any combination of a-k; or
   m. any combination of a-k where one liquid enhancement component interacts or reacts with another or with the conditioned liquid stream.

18. The method of claim 7 further comprising the step of controlling the liquid dispensing system and the liquid enhancement system, with a plurality of controls associated with a user interface on the refrigerator.

19. A method for conditioning at least one liquid stream with a liquid dispensing system associated with a refrigerator, preparing an enhanced beverage using one or more of the individually conditioned liquid streams and a liquid enhancement device, and minimizing the potential for back contamination of the liquid dispensing system, the method comprising:
   providing a cabinet body defining an interior;
   providing at least one door for selective access to the interior, with a liquid dispensing outlet and a liquid enhancement device interface circumscribing the liquid dispensing outlet;
   conditioning the liquid stream to provide a plurality of individually conditioned liquid streams comprising:
      a. a cooled liquid stream and a heated liquid stream;
      b. a cooled liquid stream and a carbonated liquid stream;
      c. a heated liquid stream and a carbonated liquid stream; or
      d. a cooled liquid stream, a heated liquid stream and a carbonated liquid stream; and
   securing the liquid enhancement device to the liquid enhancement device interface without opening the door;
   dispensing the individually conditioned liquid stream from the liquid dispensing outlet through a liquid flow path in the liquid enhancement device;
   configuring the liquid flow path to a flow through mode passing the individually conditioned liquid stream through the liquid flow path and a liquid enhancement component and a flow by mode passing the individually conditioned liquid stream through the liquid flow path and by an outlet in communication with the liquid enhancement component; and
   enhancing the individually conditioned liquid stream with the liquid enhancement device to prepare the enhanced beverage.

20. The method of claim 19 further comprising the step of imparting or affecting the individually conditioned liquid stream with one or more liquid enhancement components in the liquid enhancement device by:
   a. passing the individually conditioned liquid stream through an inlet in the liquid enhancement device in fluid receiving communication with the liquid dispensing outlet, combining or affecting the individually conditioned liquid stream with the liquid enhancement component and dispensing the enhanced beverage out an outlet of the liquid enhancement device.

21. The method of claim 19 further comprising the step of securing cooperating attachment interfaces on the liquid enhancement device interface and the liquid enhancement device together to retain the liquid enhancement device at the liquid dispensing outlet.

22. The method of claim 21 further comprising the step of securing the cooperating attachment interfaces by:
  a. threading the attachment interfaces together;
  b. snapping the attachment interfaces together;
  c. coupling the attachment interfaces together;
  d. hooking the attachment interfaces together;
  e. clamping the attachment interfaces together;
  f. clipping the attachment interfaces together; or
  g. pressure fitting the attachment interfaces together.

23. The method of claim 19 further comprising the step of rupturing a pressure rupturable seal at the inlet and the outlet of the liquid enhancement device with the individually conditioned stream to combine the individually conditioned liquid stream with the liquid enhancement component for providing the enhanced beverage.

24. The method of claim 19 further comprising the step of providing an oxygenated liquid stream.

25. The method of claim 19 further comprising the step of providing an irradiated liquid stream.

\* \* \* \* \*